INVENTOR.
Otto J. M. Smith
BY
Attorneys

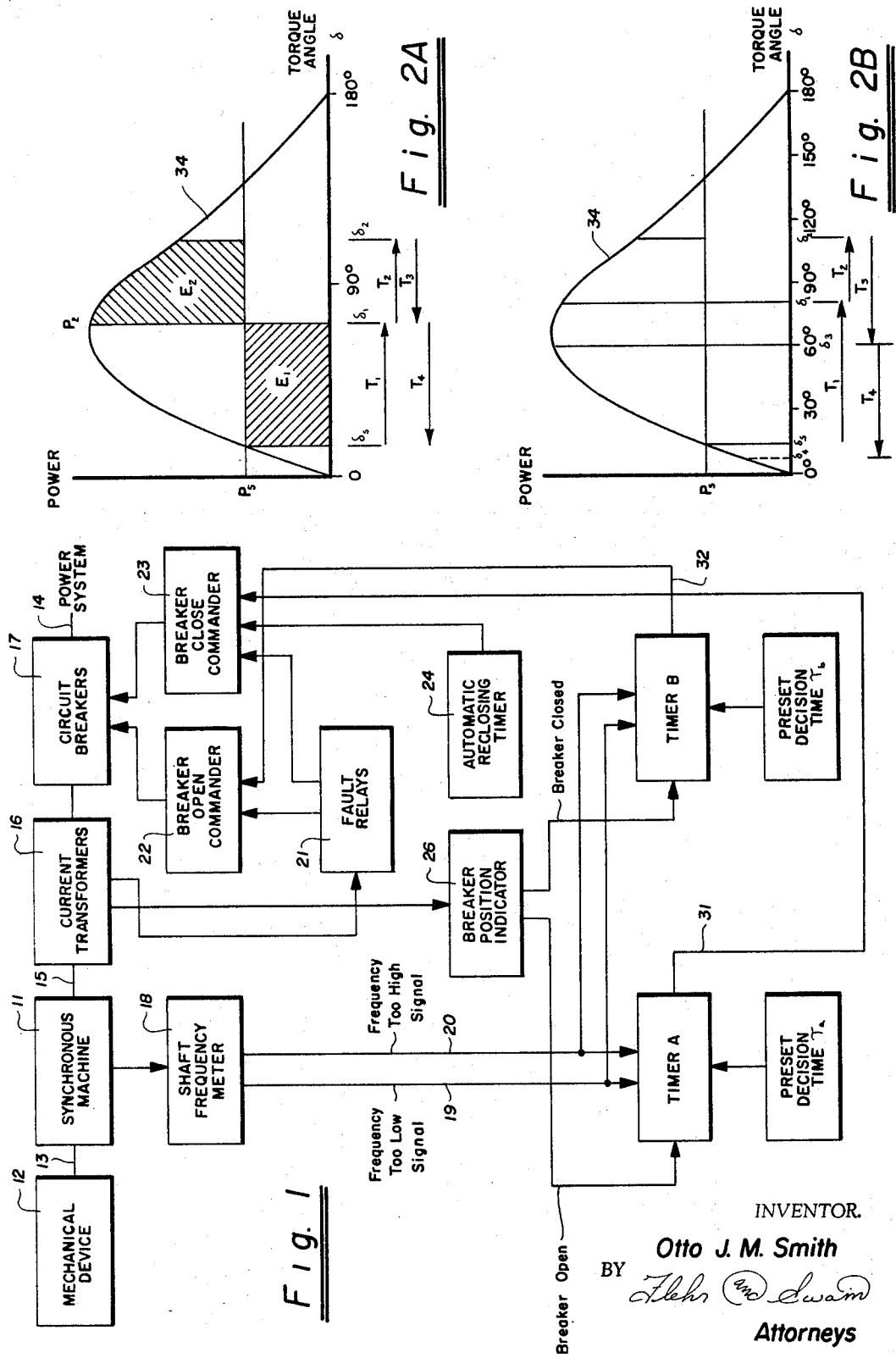

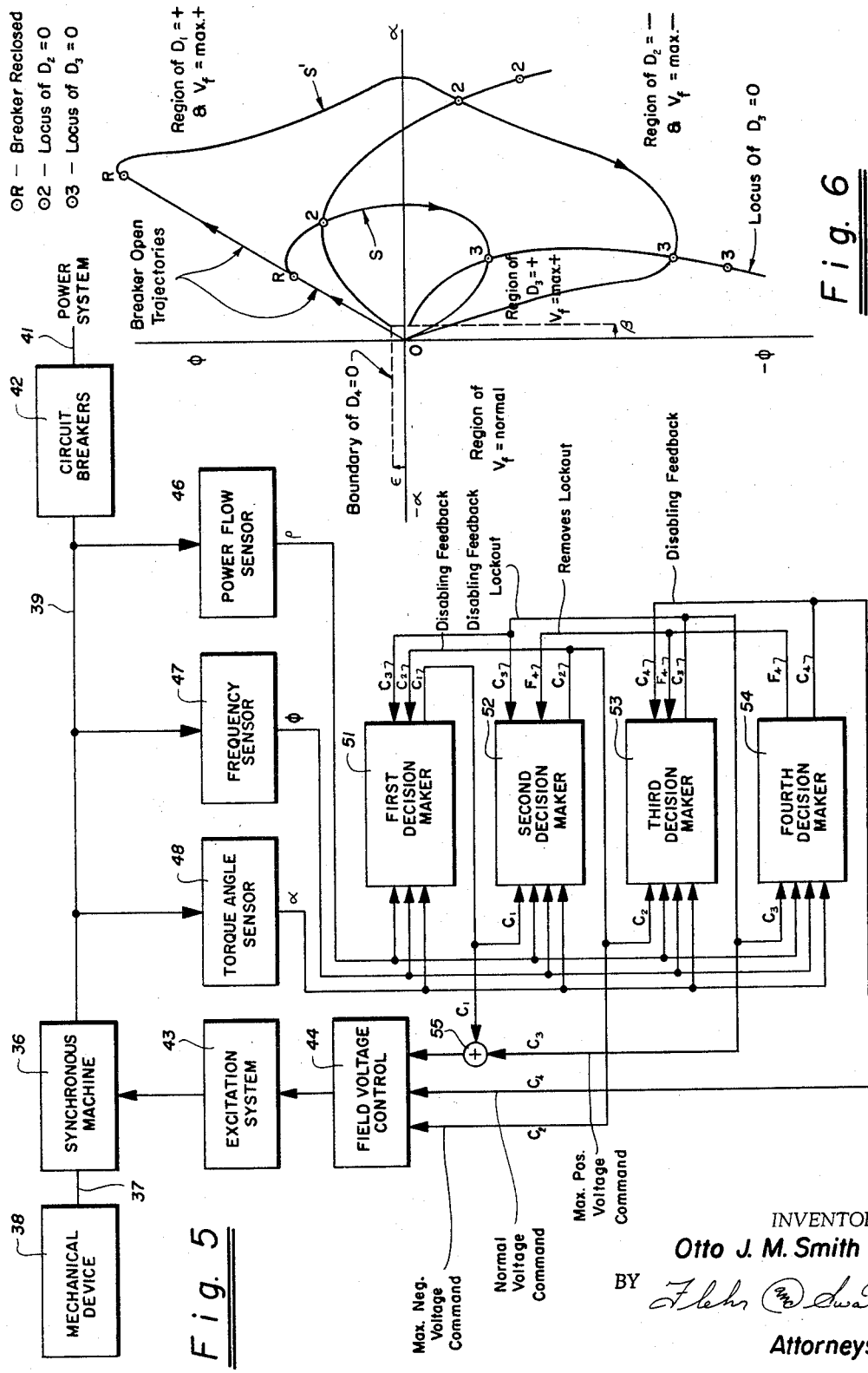

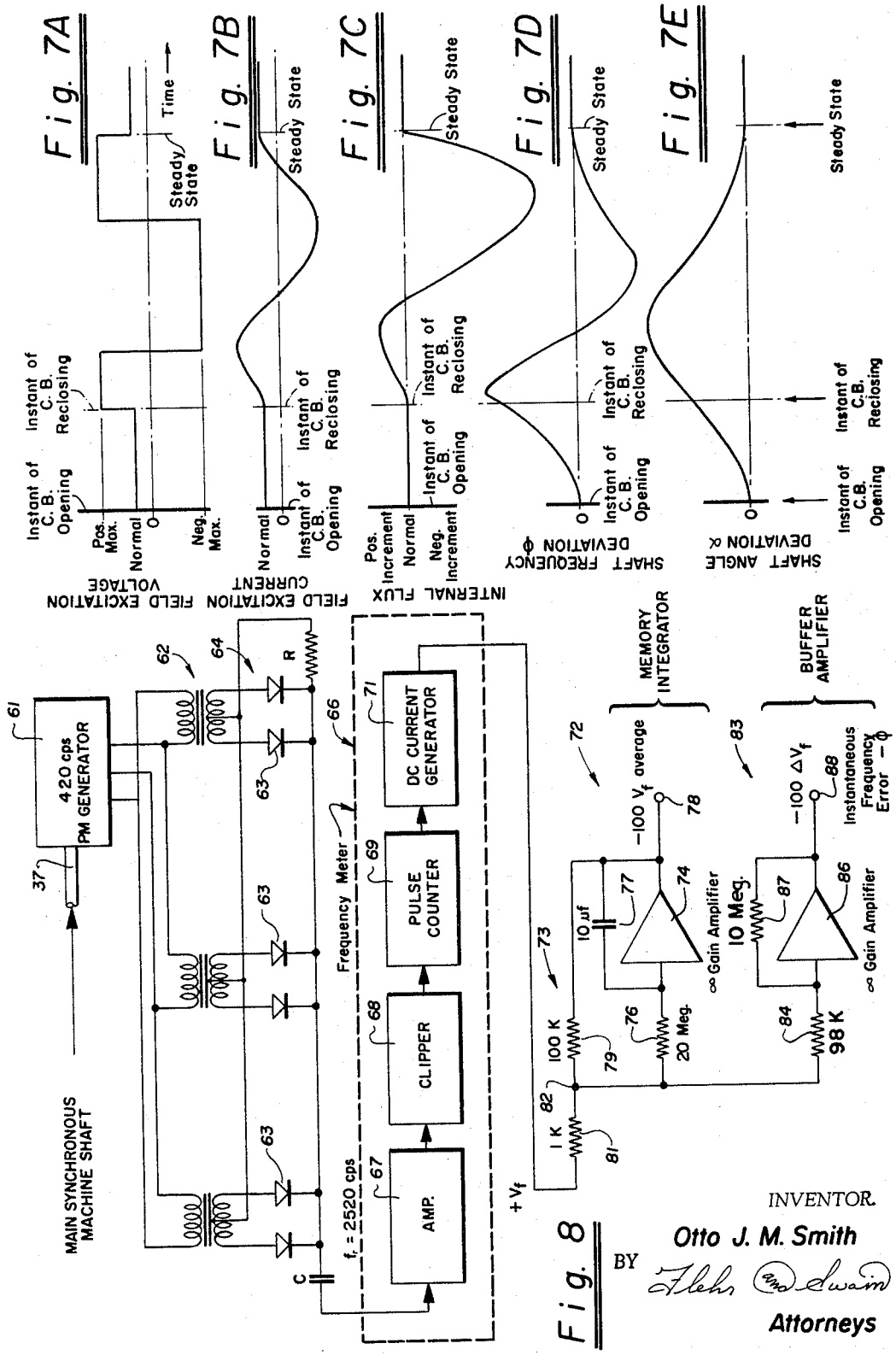

June 11, 1968  O. J. M. SMITH  3,388,305
SYSTEM, APPARATUS AND METHOD FOR IMPROVING
STABILITY OF SYNCHRONOUS MACHINES
Filed Jan. 21, 1964  7 Sheets-Sheet 6
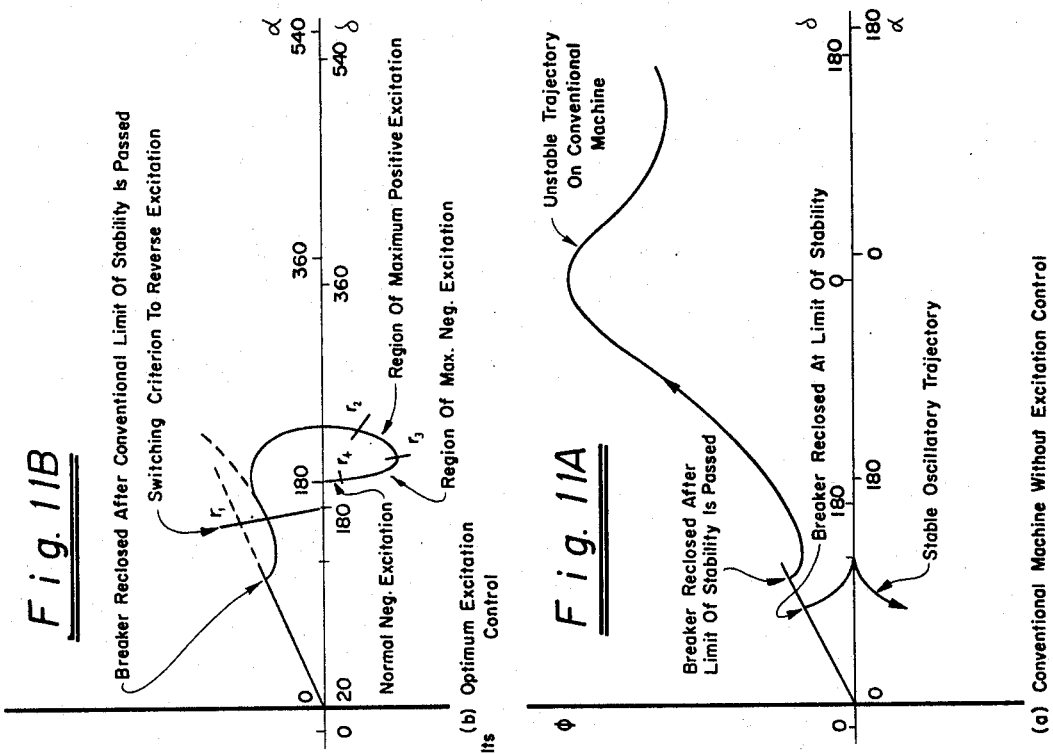
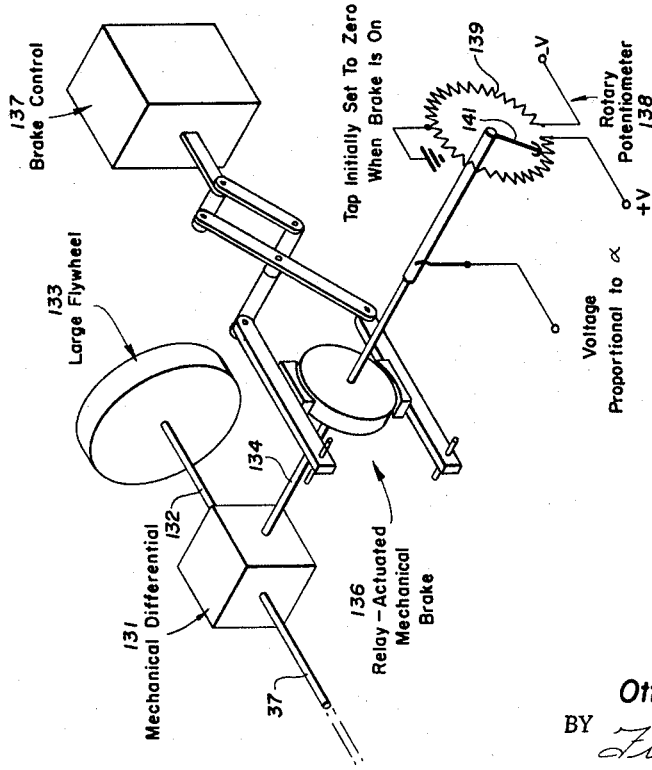
INVENTOR.
Otto J. M. Smith
BY
Attorneys INVENTOR.
Otto J. M. Smith
BY
Attorneys United States Patent Office  3,388,305
Patented June 11, 1968

3,388,305
SYSTEM, APPARATUS AND METHOD FOR IMPROVING STABILITY OF SYNCHRONOUS MACHINES
Otto J. M. Smith, 612 Euclid Ave.,
Berkeley, Calif. 94708
Filed Jan. 21, 1964, Ser. No. 339,136
101 Claims. (Cl. 318—175)

This invention relates to a system, apparatus and method for improving the stability of synchronous machines, and more particularly to a system, apparatus and method of control for a synchronous machine so that transient oscillations of the shaft due to momentary power line disconnections can be reduced to zero in a minimum time and steady state reestablished.

At the present time, it is known that two or more synchronous machines in parallel can display oscillations following a change in the load, in the excitation, in the impedance of the transmission lines, or in switching. These oscillations can appear in the torque angles of the machines, in the frequency, and in the power flow to or from each machine. A single synchronous machine, connected to a power system through circuit breakers, will display shaft angular oscillations when the circuit breakers are momentarily opened and then reclosed, as occurs normally under fault conditions on the transmission line linking the machine to the power system, or when the transmission line is subjected to a lightning stroke. As is also well known to those skilled in the art, such large oscillations are very undesirable because two or more machines may be unstable in combination and can cause circuit breakers to open a second time to, in effect, create a run-away situation. Even with a single machine, if the time that the machine is disconnected from the power line is sufficiently great, it is impossible to place or keep the machine on the line. There is, therefore, a need for a new and improved system, apparatus and method whereby large oscillations can be reduced to a negligible amount within a short period of time.

In general, it is an object of the present invention to provide a system, apparatus and method for improving the stability of synchronous machines in which large oscillations can be reduced to a negligible amount within a very short period of time by appropriately controlling either the excitation of the synchronous machine or the circuit breakers connecting the machine to the power system.

Another object of the invention is to provide a system, apparatus and method of the above character in which large oscillations are reduced by non-linear decision functions which observe the state of the system.

Another object of the invention is to provide a system, apparatus and method of the above character in which the shaft angle of the machine is controlled so that transient oscillations of the shaft due to momentary power line disconnections or changes in power flow are reduced to zero in minimum time and steady state conditions are reestablished.

Another object of the invention is to provide a system, apparatus and method of the above character in which transient oscillations of the shaft due to momentary power line disconnections are reduced to zero in minimum time and steady state reestablished by increasing the field excitation voltage to a maximum, reversing this voltage to a negative maximum as the rotor approaches its maximum negative frequency deviation, reapplying maximum positive excitation to overcome the field time delay when the rotor is approaching its steady state torque angle position, and applying normal excitation when the rotor is at its correct steady state angle, at the correct steady state frequency, and the field current is at its correct steady state value.

Another object of the invention is to provide a system, apparatus and method of the above character in which the conditions for reducing transient oscillations to zero in minimum time can be fulfilled simultaneously by the proper selection of switching times for the events set forth above, or by the proper selection of the relationship between the states of the system and several preselected switching curves or decision curves such that when the system state fulfills certain conditions, the excitation is switched to its next following value in the sequence set forth above.

Another object of the invention is to provide a system, apparatus and method of the above character in which torque angle and frequency information can be used by the decision makers.

Another object of the invention is to provide a system, apparatus and method of the above character in which a running tally of the stored energy in the rotor can be obtained from wattage integrations from the power flow information which can be utilized for the decision making and can be used instead of frequency as an acceptable state variable for generating switching curves.

Another object of the invention is to provide a system, apparatus and method of the above character in which a state variable can be obtained from a combination of the power flow and phase of the current of the machine, the state variable being used to drive switching curves instead of using troque angle information.

Another object of the invention is to provide a system, apparatus and method of the above character in which second order phase planes can be used instead of third order state space or phase switching surfaces.

Additional objects and features of the invention will appear from the following description in which the preferred embodiments are set forth in detail in conjunction with the accompanying drawings.

Referring to the drawings:

FIGURE 1 is a block diagram of a system and apparatus incorporating my invention for improving stability of a synchronous machine connected to a power system wherein circuit breakers are used for controlling the power flow.

FIGURES 2A and 2B are simplified diagrams of power versus torque angle curves for a synchronous machine.

FIGURE 5 is a block diagram of another embodiment of my system and apparatus for improving the stability of a synchronous machine connected to a power system through the use of state variables derived from a torque angle sensor, a frequency sensor and a breaker position sensor.

FIGURE 6 gives a phase presentation of a typical transient on a synchronous generator incorporating the control system and apparatus shown in FIGURE 5.

FIGURES 7A–7E show a typical sequence of events in utilizing the apparatus shown in FIGURE 5 for improving the stability of a synchronous machine.

Figure 3:
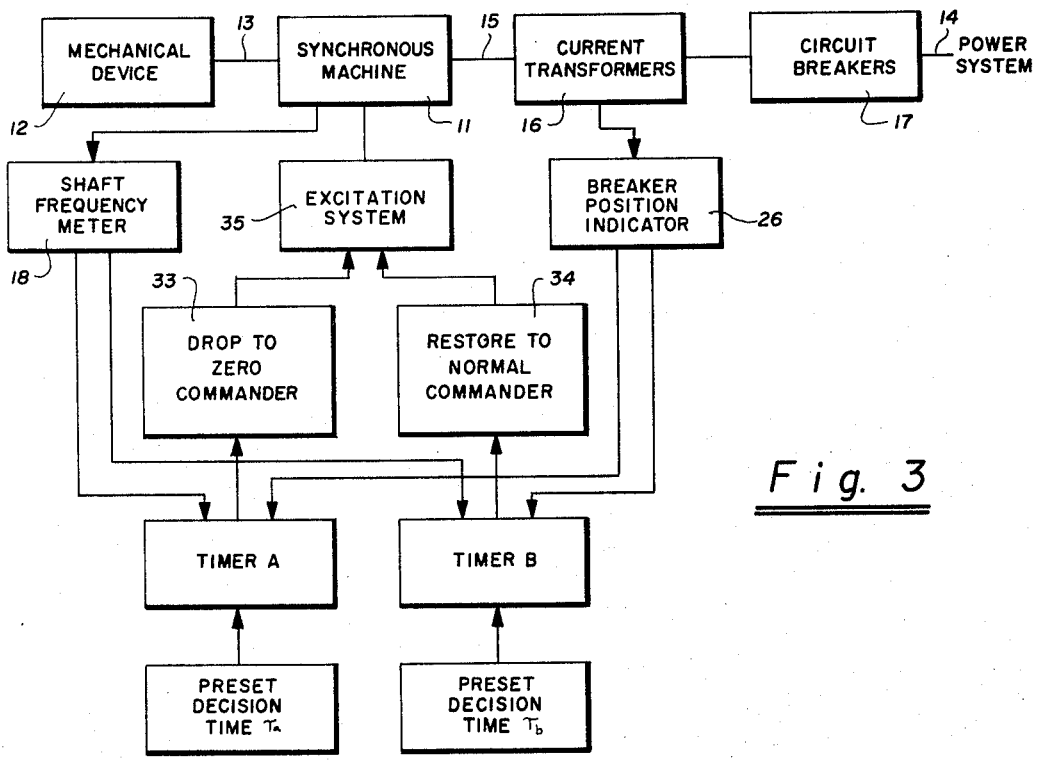
FIGURES 3 and 4 are block diagrams of additional systems and apparatus incorporating my invention in which the excitation windings are used to control the power flow.

FIGURE 8 is a circuit diagram, partially in block form, of a frequency sensor utilized in the apparatus shown in FIGURE 3.

Figure 9:
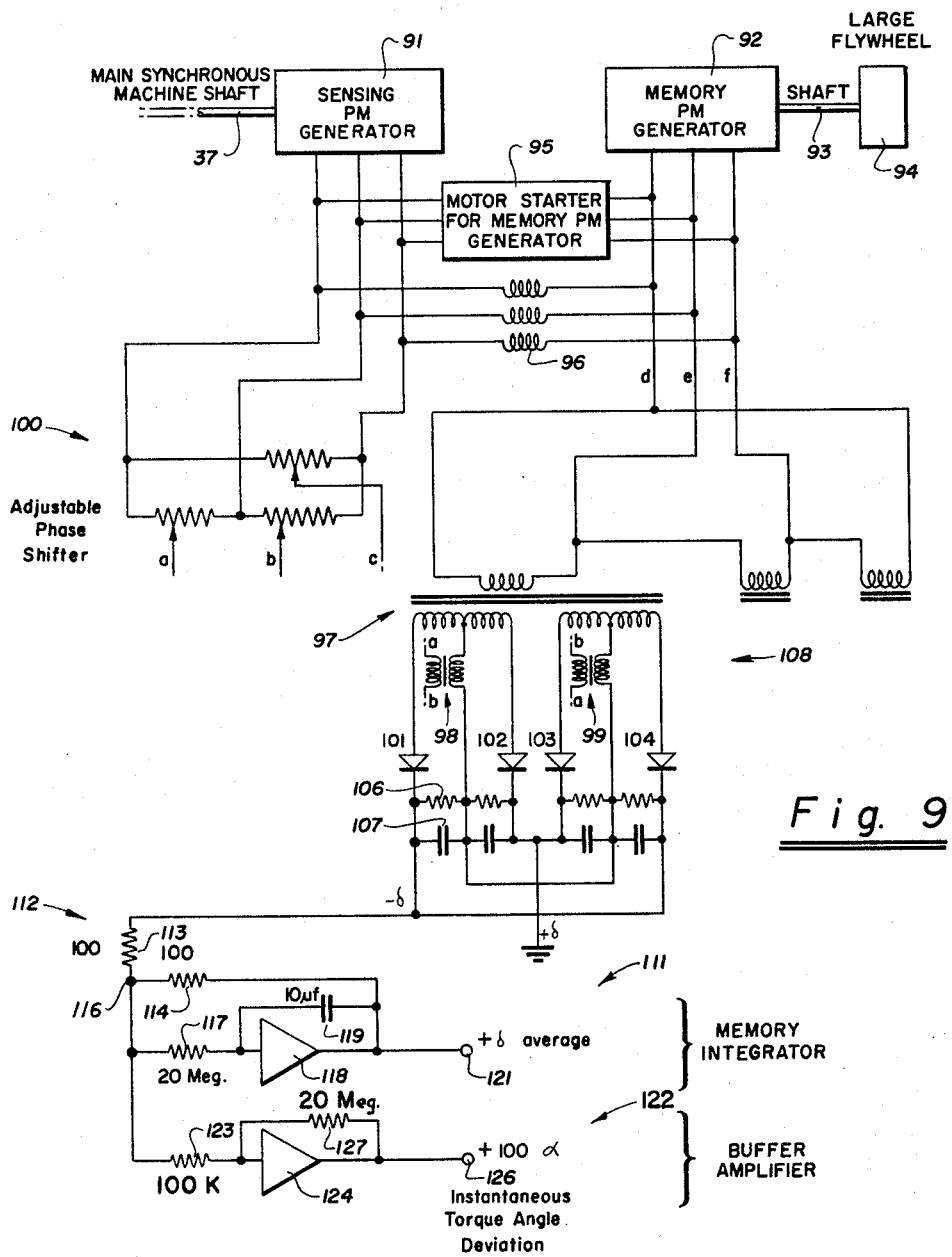

FIGURE 9 is a circuit diagram, partially in block form, of the torque angle sensor shown in FIGURE 3.

FIGURE 10 is a diagram, partially schematic, of apparatus for obtaining a signal proportional to the torque angle deviation α.

FIGURE 11A is a diagram of rotor frequency versus angle of a conventional synchronous machine without excitation control showing stable and unstable trajectories.

FIGURE 11B is a diagram of rotor frequency versus angle for a synchronous machine with a control apparatus providing an optimum excitation control.

FIGURES 12–15 are circuit diagrams of the first, second, third and fourth decision makers shown in FIGURE 5.

In general, my system, apparatus and method for increasing the stability of a synchronous machine causes the transient oscillations of the shaft due to momentary power line disconnections to be reduced to zero in minimum time and the steady state condition reestablished by scheduling the following conditions. First, the machine electrical power flow is increased to a maximum. This power flow is then reduced to a minimum value or reversed to a negative maximum as the rotor approaches a frequency deviation of opposite polarity to the initial frequency deviation and of an amount approximately equal to the maximum frequency deviation of the initial polarity. Normal power flow can then be scheduled. Alternatively, it may be desirable prior to scheduling normal power flow to schedule that the power flow be increased to a positive maximum when the rotor is approaching its steady state torque angle position. Normal power flow can then be scheduled when the rotor is at its correct steady state angle at the correct steady state frequency. These three conditions can be fulfilled substantially simultaneously by the proper selection of the switching times for this sequence of excitation events or by the proper selection of the relationship between the states of the system and several preselected switching curves or decision curves such that when the system state fulfills certain conditions, the power flow is switched to its next following value in the sequence set forth above.

In FIGURE 1, there is shown in block diagram form, a system and apparatus incorporating my invention for improving the stability of a synchronous machine 11. The synchronous machine 11 is of a conventional type and consists of one stationary part, the stator, and one movable part, the rotor. It also consists of at least one excitation winding and at least one power winding. The synchronous machine can be either a motor or a generator. The excitation windings can be rotated or held stationary, and similarly the power winding can be rotated or held stationary, as is well known to those skilled in the art. The excitation and power windings may both be placed on the same structure, as in reluctance machines, or the excitation winding may be movable with respect to the power winding. The rotating part of the synchronous machine 11 is connected to a mechanical device 12 by a shaft 13. If the machine 11 is to be used as a generator, the mechanical device can be a suitable power source such as a steam turbine. Conversely, if the machine 11 is to be used as a motor, the mechanical device can be a suitable load such as a fan or compressor.

The power winding of the synchronous machine 11 is connected to a power system 14 of a conventional type such as a 60 c.p.s. three-phase power system by a power circuit 15 through current transformers 16 of a conventional type and circuit breakers 17 of a conventional type.

A control system is provided for influencing or controlling the power flow from or to the power windings of the synchronous machine 11. Means is provided for measuring a first state variable and means is provided for measuring a second state variable of the synchronous machine. As hereinafter explained, the state variables of the machine can consist of such parameters as power flow, frequency, torque angle, etc. Means is also provided for nonlinearly combining the first and second state variables and then controlling or scheduling the power flow in accordance with the combined state variables. In FIGURE 1, the control system controls the power flow by controlling the operation of the circuit breakers 17.

In FIGURE 1, the control system, in addition to the current transformers 16 and the circuit breakers 17, consists of means for measuring a first state variable of the electrical machine 11. This means is comprised of a frequency meter 18 which is preferably mounted on the shaft 13 and is driven by the shaft 13 on the synchronous machine 11. The meter 18 thus measures the shaft speed or frequency of the movable part which is one state variable of the machine 11. The meter 18 can be of any suitable type such as a small auxiliary 420 c.p.s. permanent magnet generator which is mounted on the shaft 13 of the synchronous machine. The output of the shaft frequency meter 18 is compared against the average frequency for the past several minutes as shown in FIGURE 6 to provide the following information.

$$\phi = k(f - f_{average}) \quad (1)$$

where $\phi$ = frequency deviation
$k$ = constant
$f$ = frequency output from shaft frequency meter 18
$f_{average}$ = average frequency output from shaft meter 18 for past several minutes As shown in FIGURE 1, the output of the shaft frequency meter 18 has two output channels 19 and 20. Channel 19 carries a command signal when the shaft frequency of the synchronous machine 11 is lower than the normal operating frequency, i.e., $\phi$ is negative. Channel 20 carries a command signal when the shaft frequency of the synchronous machine 11 is higher than the normal operating frequency, i.e., $\phi$ is positive.

The current transformers 16 measure a second state variable of the machine 11, i.e., current flow in the power circuit 15, and also provide the conventional information for fault relay 21. As is well known, the fault relay 21 can open the circuit breakers 17 through a breaker open commander 22 when the current magnitude in the power circuit 15 is excessive or when the fault relays indicate an unbalanced or short circuit on the transmission lines of the power system. The fault relays 21 are also capable of reclosing the circuit breakers 17 through a breaker close commander 23 when they indicate that the transmission line difficulties have been cleared. An automatic reclosing timer 24 is connected to the breaker close commander 23 as shown in FIGURE 1 and is provided for automatically reclosing the circuit breakers after certain intervals of time have elapsed.

A breaker position indicator 26 connected to the current transformers 16 indicates that the circuit breakers 17 are open when the currents are zero. The breaker position indicator 26 also indicates that the breakers 17 are closed when the currents are within the normal operating range of the synchronous machine. The indicator 26 also indicates when the currents are excessive due to fault conditions on the transmission line.

The current transformers 16, the circuit breaker 17, the breaker open commander 22, the breaker close commander 23, the fault relays 21, the breaker position indicator 26 and the automatic reclosing timer 24 are all substantially conventional and hence will not be described in detail.

As also shown in FIGURE 1, a timer A and a timer B are provided. Timer A receives both channels of frequency information from the shaft frequency meter 18 and breaker open information from the breaker position indicator 26. Timer B receives both channels of the frequency information from the shaft frequency meter 18 and receives breaker closed information from the breaker position indicator 26.

The timers A and B can be digital counters of a conventional type connected so that they can add signals appearing on one channel and subtract the signals appearing on a different channel. In addition, the digital counters should be counters of the type which can run both forwards and backwards. That is, they should be able to count a certain interval of time as positive and count the following interval of time as negative, and deliver a signal which is proportional to the difference between the two intervals of time.

If there is only one set of circuit breakers 17, then timer A is arranged to count positive time when the set of breakers 17 is open and the frequency is too high if the synchronous machine 11 is a generator, or when the frequency is too low if the synchronous machine 11 is a motor. Conversely, the timer A is arranged to count negative time when the set of breakers 17 is open and the frequency is too low if the synchronous machine is a generator, or when the frequency is too high if the synchronous machine 11 is a motor. Timer A does not count when the set of breakers 17 is closed.

If there is only one set of circuit breakers 17, then timer B is arranged to count positive time when the set of circuit breakers 17 is closed and the frequency is too high if the synchronous machine 11 is a generator, or when the frequency is too low if the synchronous machine 11 is a motor. Timer B is arranged to count negative time when the set of breakers 17 is closed and the frequency is too low if the synchronous machine is a generator, or when the frequency is too high if the snychronous machine 11 is a motor. Timer B does not count when the set of circuit breakers 17 is open.

If there are multiple circuit breakers 17, and several transmission lines or circuits connecting the circuit breakers to the power system 14, then one or more of the circuit breakers 17 could be closed, and power could flow over one or more of the transmission lines. Timer A in this case is arranged to count time during the entire interval after a change in the circuit breakers 17 reducing the number of transmission lines carrying power and before a subsequent change when one or more of the circuit breakers 17 close. Timer A counts positive time when during the counting interval the frequency is too high if the synchronous machine is a generator, or the frequency is too low if the synchronous machine is a motor. Timer A counts negative time when during the counting interval the frequency is too low if the synchronous machine 11 is a generator, or the frequency is too high if the synchronous machine 11 is a motor. Timer A does not count time when Timer B is counting, and does not count during steady-state power flow.

If there are multiple circuit breakers 17 connected to several transmission lines or circuits, timer B is arranged to count time during the entire interval after one or more circuit breakers 17 close and before one or more circuit breakers 17 open. Timer B counts positive time when during the counting interval the frequency is too high if the synchronous machine 11 is a generator, or the frequency is too low if the synchronous machine is a motor. Timer B counts negative time when during the counting interval the frequency is too low if the synchronous machine 11 is a generator, or the frequency is too high if the synchronous machine is a motor. Timer B does not count when timer A is counting, and does not count during steady-state power flow.

Timer A is arranged so that when the totalized time bears a certain predetermined relationship to a preset decision time $\tau_a$, a command signal appears on an output circuit 31 to the breaker close commander 23 causing the circuit breakers 17 to close. Timer B is arranged so that when the totalized time bears a predetermined relationship to a preset decision time $\tau_b$, a command signal appears on an output circuit 32 to the breaker open commander 22 to cause the circuit breakers 16 to open.

The output of the timer A is compared internally with the preset decision time $\tau_a$ so that when the total time recorded by the time A is more negative than the preset decision time, an output command signal is generated on circuit 31 which goes to the breaker close commander 23. The breaker close commander receives information from either the fault relays 21, the timer 24, or the timer A and will close the circuit breakers 17 if it receives a close command from either the fault relays, the timer 24, or from the timer A.

Timer B is also arranged to count both positive and negative time and the summation of these times is an output which is compared against the preset decision time $\tau_b$ so that when the output of the timer B goes more negative than this preselected preset decision time, a command signal is generated on the circuit 32 which is passed to the breaker open commander 22. The breaker open commander receives information from either the fault relays 21 or the timer B and will open the circuit breakers 17 if it received a command from either the fault relays 21 or from the timer B.

The mode of operation of the apparatus shown in FIGURE 1 may now be briefly described as follows. Under normal operating conditions, the synchronous machine 11 can be either delivering or receiving a power less than its rated power through the current transformers 16 and through the circuit breakers 17 which are closed. There will be no commands coming from the fault relays 21. The breaker position indicator 26 will show that the breakers 16 are closed. The output from the shaft frequency meter 18 will be ambiguous with the signals on both the too low and too high channels 19 and 20 being either nonexistent or too small to be significant. In case the synchronous machine 11 is a generator, it will be delivering power to the power system 13 and this power must have originated in a prime mover 12 connected to the shaft of the synchronous machine 11. When a fault occurs on the transmission line, between the synchronous machine and the power system, the fault relays 21 will indicate an excessive current flow and will issue a command to the breaker open commander which will open the circuit breakers. The power which was previously flowing into the synchronous machine 11 on its shaft and out through its power circuit to the power system 14 is now prevented from flowing through the transmission line, and this power flows into the moment of inertia of the synchronous machine causing the rotor to begin to speed up. The phase angle of the rotor structure will advance ahead in phase, and the frequency of the rotor structure will rise above the rated operating frequency. The output of the frequency meter 18 will indicate a signal on the too high channel 20 and this signal will be detected by both timer A and timer B. The breaker position indicator 26 will measure that there is no current flowing in the current transformers and will deliver a signal on the breaker open channel to timer A.

Timer A runs in a positive direction and counts the time positive when there is a coincidence between the breaker open measure and the too high frequency indication. Timer A runs backwards and counts negative time when there is a coincidence between the breaker open indication and the too low frequency indication. Timer A stops running and remembers its totalized time when the breaker open indication is nonexistent, i.e., when the breaker closed channel has an indication on it. Timer B runs forward in the positive direction, and counts positive time when there is a breaker closed indication and a too high frequency indication. Timer B runs backwards and counts negative when there is a breaker closed indication and a too low frequency indication. Timer B stops and remembers its totalized time when there is breaker open indication.

From the foregoing, it can be seen that immediately after the circuit breakers 17 open the transmission line linking the synchronous machine 11 to the power system 13, which previously was carrying power, timer A will start running in the forward direction and will continue to measure the time that the circuit breakers 17 are open until the next following event. This event is the measurement by the fault relays 21 that the fault has been cleared, or the automatic reclosing timer 24 has decided that the circuit breakers 17 should be reclosed. The breaker closed command will be delivered by one or the other of these mechanisms to the breaker close commander 23 and this will close the circuit breaker. When this event occurs, the breaker position indicator 26 will deliver a breaker-closed signal and the frequency meter 18 will continue to deliver a too-high frequency signal. Timer A will stop timing and timer B will commence timing.

Timer B will continue to run forward while the synchronous machine 11 is delivering more than rated power to the power system and is, therefore, slowing down. The AC synchronous machine rotor continues to rock forward in phase at a continuously diminishing rate until all of the extra energy that was stored in the rotor during the breaker-open period has been removed, and the rotor is turning at rated speed, but has a much higher torque angle than rated. When this condition occurs, the frequency too high signal will disappear from the output of the frequency meter 18 and the frequency meter will begin to deliver a frequency too low signal. Timer B then begins to receive a breaker-closed indication and a frequency too low signal which starts timer B running backwards and counting negative time.

Timer B continues to run backwards while the synchronous machine 11 is slowing down and its internal torque angle is diminishing. When timer B reaches the preset decision time $\tau_b$, it delivers an execute command on circuit 32 to the breaker open commander 22 and the circuit breakers 17 open up. At this instant, the synchronous machine has a torque angle which is too positive, a frequency which is too negative, and an energy stored in the rotor which is too small. By opening up the circuit breaker, the power delivered by the synchronous machine 11 is no longer permitted to pass to the power system 14, but now goes into the moment of inertia in the rotor speeding up the rotor and tends to bring the rotor back to rated speed and rated frequency. During this interval, the breaker position indicator 26 delivers a breaker-open signal and the frequency meter 18 delivers a frequency-too-low signal, so that timer A is now running backwards counting negative time. When the summation of times in timer A reaches the preset decision time $\tau_a$, a command signal is submitted to the breaker-closed commander on circuit 31 which then recloses the circuit breakers 17.

The instant of reclosing of the circuit breakers 17 can be chosen to correspond with the instant at which the synchronous machine 11 is running at rated frequency at rated speed with the rotor steady state torque angle which the machine 11 assumes when delivering the quantity of power flowing from shaft to transmission line. If these conditions are fulfilled, the oscillation is completely removed and the synchronous machine 11 has been restored to steady state operating conditions. If there were no losses in the synchronous machine, and if it did not have an amortisseur winding, then the preset decision times for both timer A and timer B would be essentially zero to accomplish this desirable operating mode. The effect of high speed excitation controls, of high speed governor mechanisms for the turbine connected to the synchronous machine shaft, of damping windings within the synchronous machine, and of changes in phase of the power system can be compensated for by selecting the preset decision time for timer A and preset decision time for timer B at values other than zero, so that the transient concludes with bringing the synchronous machine to its steady state torque angle and its steady state frequency simultaneously.

From the foregoing, it can be seen that the timers A and B serve as means for combining nonlinearly first and second state variables and produce command signals for controlling the breakers 17 to thereby schedule the power flow from the machine 11 in the desired manner as set forth above.

FIGURES 2A and 2B show simplified diagrams of the power versus torque angle curve for a synchronous machine. The vertical coordinate is power and the horizontal coordinate is torque angle. For the case where the synchronous machine is a synchronous generator, let $P_s$ be the shaft power coming into the generator. This is shown by the horizontal line in FIGURES 2A and 2B. The sinusoidal shaped curve 34 is the power delivered by the armature of this synchronous generator. The abscissa $\delta_s$ is the steady state rotor torque angle with reference to the center line of armature coil of zero voltage prior to a disturbance. When the circuit breaker opens, the AC power flow drops to zero and the power $P_s$ flows into the rotor causing it to speed up and causing the torque angle to change from $\delta_s$ to $\delta_1$. If the circuit breakers 17 are reclosed at the instant that the torque angle is $\delta_1$, then the state of the machine at this instant is that the total energy stored in the rotor has been increased by the area given by the rectangle whose base is $\delta_1-\delta_s$ and whose height is $P_s$. This energy is proportional to $$E_1 = P_s(\delta_1 - \delta_s) \tag{2}$$

During this time, the frequency is above normal. Timer A is, therefore, running in the forward direction. The time that it takes to go from $\delta_s$ to $\delta_1$ is recorded as time $T_1$ in timer A. After the circuit breakers have reclosed, the power delivered by the machine to the power system rises to $P_2$. This power is greater than that coming from the shaft and, therefore, the power difference $P_2-P_s$ must be abstracted from the rotational energy stored in the moment of inertia of the rotor. The rotor is going too fast but it will not slow down until it reaches the rated speed at the torque angle $\delta_2$. The energy abstracted from the rotor is the area above the line $P_s$ and below the sinusoidal shaped curve lying between $\delta_1$ and $\delta_2$.

$$E_2 \int_{\delta_1}^{\delta_2}(P_2 - P_s)d\delta \tag{3}$$

This energy is approximately equal to the energy previously stored in the rotor during the transient from $\delta_s$ to $\delta_1$ and the two cross-hatched areas in FIGURE 2A are approximately equal. Therefore, $E_2=E_1$. The time required to go from $\delta_1$ to $\delta_2$ is recorded in timer B as time $T_2$. After reaching the torque angle $\delta_2$ the rotor begins to slow down and the torque angle diminishes from $\delta_2$ to $\delta_1$ during the time $T_3$. At this instant, timer B has stored $T_2-T_3$. If the preset decision time for timer B is set at 0, then when $T_3=T_2$ timer B delivers a breaker open command. For conventional machines, this is approximately the instant that the rotor reaches torque angle $\delta_1$. After the circuit breaker opens, the AC power drops to zero and the torque angle continues to diminish from $\delta_1$ to $\delta_s$ during the time $T_4$ which is subtracted from timer A. Timer A has stored $T_1-T_4$. If the preset decision time for timer A is set at zero, then when time $T_4=$ time $T_1$ the timer A will deliver the breaker close command and this will occur when the torque angle is approximately $\delta_s$ and the frequency is equal to rated frequency. At this instant, then the breakers 17 will reclose and the AC power will jump to $P_s$ at a torque angle of $\delta_s$. The previous discussion for FIGURE 2A assumed that there was no amortisseur winding in the machine 11 and that if the energy removed from a rotor were equal to the energy stored in the rotor, that the rotor would return to its previous condition.

The effect of an amortisseur winding is to cause a proportion of the energy stored in the rotor to be continuously wasted when the rotor is moving at too high a speed. Therefore, to return the rotor to an initial condition, if energy is first stored in it, then less energy should be removed from it by the circuit breaker scheduling. This is illustrated in FIGURE 2B. During the portions of the transient when the frequency is too high, the rotor has moved from $\delta_s$ to $\delta_1$ torque angle in time $T_1$ and has moved from $\delta_1$ to $\delta_2$ torque angle in time $T_2$. During the frequency-too-low transient the rotor will move from $\delta_2$ torque angle to $\delta_3$ torque angle in time $T_3$ and will move from $\delta_3$ torque angle to $\delta_4$ torque angle in time $T_4$. If there exists an amortisseur or damping winding, then some of the energy stored during time $T_1$ is wasted in slowing down the rotor and the power torque angle area during time $T_2$ does not have to be as large as the power torque angle area during time $T_1$ for the rotor to return to normal speed. Again, during time $T_3$ when the rotor is running too slowly, the damping winding acts like an induction motor and adds an extra quantity of energy to the rotor tending to speed it up. This speeding up action works against the direction of power flow out of the rotor due to the circuit breaker being closed during time $T_3$ but it aids the power flow into the rotor during the circuit breaker open condition of time $T_4$. Therefore, the power torque angle area during time $T_3$ must be larger than the power torque angle area during time $T_4$.

The purpose of the timer control system shown in FIGURE 1 is to cause the torque angle $\delta_4$ to coincide with the torque angle $\delta_s$. Because of the effect of the damping winding, to obtain this desirable mode of operation, $\delta_3$ must lie to the left of $\delta_1$ or $\delta_3$ must be less than $\delta_1$. If there were no other factors, the optimum control would require that $T_1$ be larger than $T_4$ for timer A and $T_3$ be larger than $T_2$ for timer B. The preset decision time $\tau_b$ for timer B would, therefore, be a small negative number of cycles and the preset decision time $\tau_a$ for timer A would, therefore, be a small positive number of cycles. The conditions for breaker commands can be set forth as follows:

$$\Sigma T_A = (T_1 - T_4) < \tau_a = \text{small positive value} \quad (4)$$

where $\Sigma T_A$ = end value or instantaneous value read by timer A
$T_1$ = time breakers 17 are open (uncontrolled)
$T_4$ = time breakers 17 are deliberately opened and speed is too slow for generator or too fast for motor
$\tau_a$ = preselected period of time $$\Sigma T_B = (T_2 - T_3) < \tau_b = \text{small negative value} \quad (5)$$

where $\Sigma T_B$ = end value or instantaneous value read by timer B
$T_2$ = time breaker is closed and speed is too fast for a generator or too slow for a motor (uncontrolled)
$T_3$ = time breaker is closed when generator is too slow or motor is too fast
$\tau_b$ = preselected period of time These times can, of course, be adjusted for other factors which have not been considered here, and can be adjusted experimentally to produce the desired mode of action. The values of the preset decision times can be made a function of the power level of the synchronous machine prior to the fault. An even more sophisticated mode of operation is to make the preset decision time for timer B a function of the magnitude of the frequency during the interval when the frequency is too low. This, therefore, gives a measure of the size of the transient swing and provides an auxiliary state variable which permits the optimum control of a system of order higher than the second.

$$\tau_b = k_1 + k_2 \phi \quad (6)$$

where $k_1$ is an empirically chosen constant representing a period of time to make correction for losses in amortisseur windings;
$k_2$ is an empirically chosen constant which represents the rate of increase of delay in the breaker opening as a function of the size of transient swing of the rotor;
$k_2 \phi$ represents a period of time.

In a similar manner, the preset decision time for timer A can be made a function of the magnitude of the frequency deviation signal (which should be zero at the instant that the timer A issues the breaker-close command) such that $$\tau_a = -T_B + k_3 + k_4 \phi \quad (7)$$

where $k_3$ is an empirically chosen constant representing a period of time to make correction for losses in the amortisseur windings;
$k_4$ is an empirically chosen constant representing accumulated mistake in the transient swing of the rotor.

After Equations 5 and 6 are fulfilled at angle $\delta_3$ and time $T_B$, the circuit breakers are opened and timer B no longer changes its value. Therefore $T_B = \tau_b$ (at instant of opening). The constant reading of this timer B should be used to calculate the correct instant for restoration of normal conditions and, therefore, $T_B$ is included in Equation 7.

Both $\tau_a$ and $\tau_b$ can have positive constants added to them to compensate for the time it takes for the breaker closing mechanisms to act and the time delay in changing the current in the machine armature and in the transmission line.

In the foregoing explanation of FIGURES 2A and 2B, it has been assumed that the synchronous machine 11 is a generator. FIGURES 2A and 2B are also applicable where it is assumed that the synchronous machine 11 is a motor and with the understanding that $\delta$ is a rotor lag angle. During $T_1$ and $T_2$ the frequency is below normal, and during $T_3$ and $T_4$, the frequency is above normal. Again, Equations 4 and 5 may be used for control. If Equations 6 and 7 for variables $\tau_a$ and $\tau_b$ are desired for control, and if $\phi$ for the motor is considered positive for shaft frequency above normal frequency, then $k_2$ and $k_4$ should be negative.

Again, there are values which can be chosen for the preset decision times for timer A and timer B such that the synchronous motor can recover its synchronization without significant oscillations beyond the first cycle when the motor has been temporarily removed from the power system for some uncontrollable cause.

In the embodiment shown in FIGURE 1, the power flow in the machine 11 is controlled by the circuit breakers 17. In the embodiment shown in FIGURES 3 and 4, the power flow in the machine 11 is controlled by controlling the excitation of the excitation winding of the machine. Thus, the timer A instead of controlling a breaker open commander 22, controls a drop-to-zero commander 33 which causes the excitation system 35 to drop the excitation on the machine 11 to zero at the same time it would have caused the breakers 17 to open to thereby cause the power flow to drop to zero. Timer B is connected to a restore-to-normal commander 34 which causes the excitation system 35 to return the excitation for the machine 11 to normal at the same time the breaker close commander 23 would have been operated.

Figure 4:
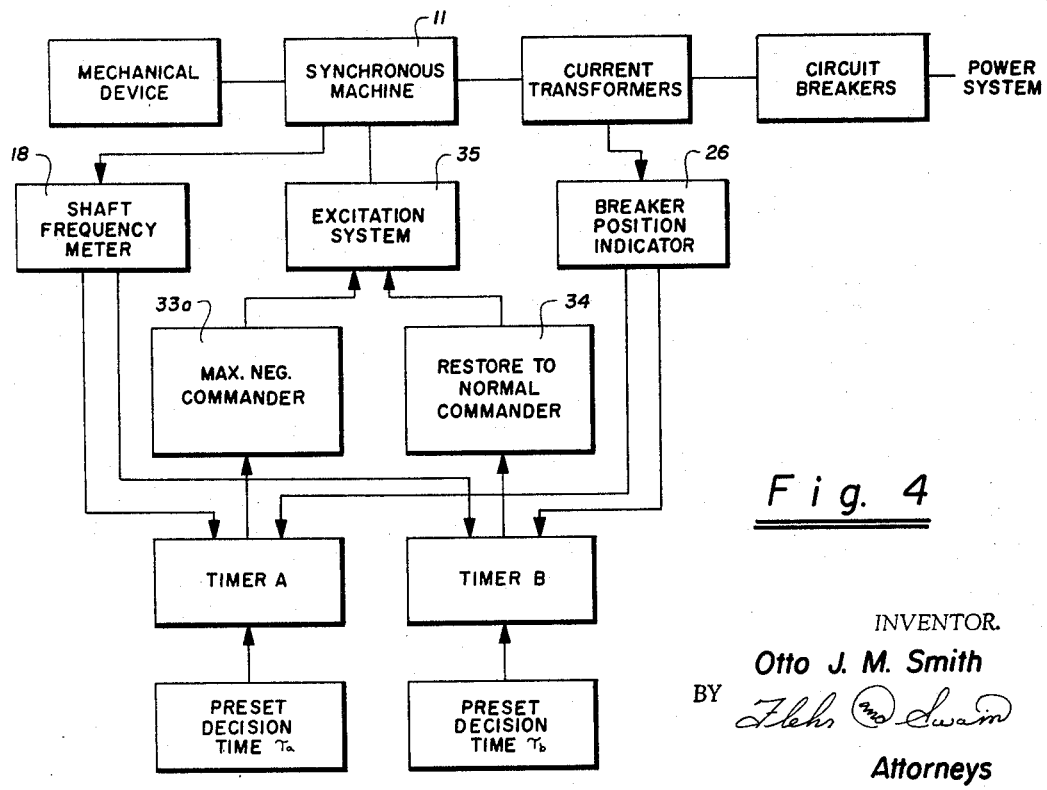

The embodiment shown in FIGURE 4 is very similar to the one shown in FIGURE 3 with the exception that a maximum-negative commander 33a has been provided in place of the drop-to-zero commander 33. The commander 33a reverses the polarity on the excitation system to provide a more rapid return to normal. The embodiment shown in FIGURE 3 is used where it is not desirable to reverse polarity on the excitation system 35.

In the embodiment in FIGURE 1, the power flow in and out of the electrical machine is controlled by operation of the circuit breakers 17. As hereinafter explained, control of the excitation of a synchronous machine can be used to effect a control on the alternating current power in the armature winding which, in turn, will control the flow of power in and out of the rotor and can, therefore, control the mechanical position and the energy stored in the rotor of a synchronous machine. The control of the excitation can be made optimum in a bang-bang maximum effort sense by using an adequate number of state variables in decision makers. Suitable state variables can be derived by sensing the shaft frequency, the shaft torque angle, the armature current and phase, the armature voltage and phase, and the field current.

FIGURE 5 shows such an embodiment of my invention in which excitation control of a synchronous machine is used to reduce mechanical oscillations to zero in minimum time through the use of state variables derived from sensing devices associated with the synchronous machine. The embodiment shown in FIGURE 5 consists of a synchronous machine 36 which can be either a motor or generator that has a shaft 37 connected to a mechanical device 38. The mechanical device 38 can be either mechanical propulsion or drive means such as a turbine or a mechanical load such as a compressor or fan. The armature or power windings of the synchronous machine 36 are connected by circuitry 39 to a power system 41 through circuit breakers 42. The excitation of the excitation or field windings of the synchronous machine 36 is derived from a DC source represented by the excitation system 43 which conventionally consists of an Amplidyne pilot excitor driving a direct current generator as a main excitor. A field voltage control 44 is provided as a part of the excitation system for controlling the excitation of the field.

Means is provided for sensing certain state variables of the electrical machine 11 and consists of a power flow sensor 46 connected to circuitry 39 and measures the in-phase component of current flowing between the synchronous machine and the power system. A frequency sensor 47 measures the frequency of the mechanical rotation of the shaft 37 of the synchronous machine 36. The frequency sensor can be of any suitable type such as a 420 c.p.s. generator mounted on the shaft 37 which supplies a multiphase rectifier whose unfiltered output is fed to a conventional frequency meter as shown in FIGURE 8. The torque angle sensor 48 measures the strobo-scopic angle of the shaft in the synchronous machine 36. This can be a measure of the phase angle of the generated voltage of a small permanent magnet generator mounted on the shaft 37 of the synchronous machine 36. The number of poles in the permanent magnet generator should be equal to or less than the number in the main synchronous machine. A phase angle memory device can be a synchronous motor driving a shaft with a very high inertia such that the frequency and phase of a second small permanent magnet generator mounted on this shaft is proportional to the average of the frequency and phase of the main synchronous machine over the past several minutes. The outputs of the torque angle sensor 48, the frequency sensor 47, and the power flow sensor 46 can be called the state variables for the system.

This type of control for the apparatus shown in FIGURE 5 is not limited to these three state variables, and may in fact use quite a different set of state variables for the same mode of operation, but the performance of this type of apparatus is dependent upon measurements made on the system which are responsive to the quantity of energy stored in the inertia or the shaft, and in the magnetic field. The three state variables are fed into a set of decision makers. In FIGURE 5 there are four decision makers 51, 52, 53 and 54. It can be seen that this type of control may use either more or less decision makers. For example, in FIGURE 1, there are only two decision makers, timer A and timer B. The system shown in FIGURE 5 can be made to work moderately well with only three decision makers. But as the complexity of the excitation system increases and as the number of variables increases, the number of decision makers should also be increased.

In FIGURE 5, the first decision maker 51 delivers an output command $C_1$ to the maximum positive input of the field voltage control 44 which controls the input to the excitation system for the synchronous machine 36. The second decision maker 52 delivers a command $C_2$ to the maximum negative input to the field voltage control 44 and also delivers a disabling feedback command $C_2$ the first decision maker 51. The third decision maker 53 delivers a maximum positive voltage command $C_3$ to the field voltage control 44 and also a disabling feedback command $C_3$ to the decision makers 51 and 52. The fourth decision maker 54 delivers a normal voltage command $C_4$ to the field voltage control 44 and a disabling feedback command $C_4$ to the third decision maker 53.

The output signal $\alpha$ from the torque angle sensor 48 is proportional to the deviation of the instantaneous torque angle from the steady state torque angle. The output signal $\phi$ of the frequency sensor is the deviation of the instantaneous frequency from the steady state frequency. $\phi$ is proportional to the derivative of $\alpha$ with respect to time. The output signal P of the power flow sensor 46 is proportional to the power flow between the synchronous machine and the power system.

The first decision maker 51 receives as inputs the signals $\alpha$, $\phi$ and P, and the signals $C_2$ and $C_3$ from the disabling feedback links from the second and third decision makers 52 and 53 respectively. The second decision maker 52 receives as inputs the activating signal $C_1$, the signals $\alpha$, $\phi$ and P, and the signal $C_3$ from the disabling feedback from the third decision maker 53. The third decision maker 53 receives as inputs the activating signal $C_2$, the signals $\alpha$, $\phi$, P and $C_4$ which is the feedback from the disabling feedback circuit from the fourth decision maker 54. The fourth decision maker 54 receives as inputs the activating signal $C_3$, and the signals $\alpha$, $\phi$ and P. In addition, the second and third decision makers 52 and 53 receive a feedback $F_4$ from the fourth decision maker 54 which can reenergize the second decision maker 52.

The detailed operation of the decision makers 51–54 can best be seen by reference to FIGURE 6. FIGURE 6 is a phase presentation of a typical transient on a synchronous generator incorporating the control mechanisms of FIGURE 5. The coordinates are frequency deviation versus angular deviation of the synchronous machine. The curves $s$ and $s'$ are typical trajectories for the entire transient with optimum control.

The first decision maker 51 calculates internally a non-linear function $D_1$ of all the four variables, $\alpha$, $\phi$, P, and $C_2$, which function can be positive, zero, or negative. When the function $D_1$ is negative, there will be no output from the first decision maker. When the function $D_1$ is positive, there will be a signal $C_1$ delivered on the output of the first decision maker 51 to the maximum positive voltage command input to the field voltage control. The function $D_1$, in general, has the following properties:

When $C_2$ is finite, $D_1$ is zero. If the power flow P is zero, $D_1$ is zero. If in a generator the power flow has been reestablished through reclosing of the circuit breaker after a fault, and $\alpha$ and $\phi$ are both positive, $D_1$ is positive. If in a motor, the power flow has been reestablished after the power supply has been momentarily disconnected, and $\alpha$ and $\phi$ are both negative, then $D_1$ is positive. When $D_1$ is positive, the first decision maker 51 delivers a maximum positive voltage command $C_1$ to the field voltage control 44. When the field voltage control 44 receives this command, it delivers the maximum possible field voltage through the excitation system 43. By positive field is meant the normal direction of voltage and current in the field system under steady state operating conditions. The action of the function $D_1$ in the first decision maker is summarized in the following table.

ative voltage to be impressed on the generator field. It also exits a finite command $C_2$ into the disabling feedback which turns off the first decision maker 51.

The function $D_2$ may be generated by power law devices or by piecewise linear devices or by trigonometric

TABLE I FOR FUNCTION $D_1$ IN FIRST DECISION MAKER

| Command $C_2$ | $\alpha$ | $\phi$ | Shaft Power | Electrical Power P | $D_1$ | Command $C_1$ | Field Voltage $V_f$ |
|---|---|---|---|---|---|---|---|
|  |  |  |  | 0 | 0 | No | Normal |
| No | $>\beta$ |  | Generator | Generator | + | Yes | Maximum positive |
| No | $<\beta$ |  | Motor | Motor | + | Yes | Maximum positive |
| Yes |  |  |  |  | 0 | No |  |
| No |  | $>\epsilon$ | Generator |  | + | Yes | Maximum positive |
| No |  | $<\epsilon$ | Motor |  | + | Yes | Maximum positive |

The second decision maker generates internally a nonlinear function $D_2$ which is a function of $\alpha$, $\phi$, P, $C_1$, $C_3$ and $F_4$. The function $D_2$, in general, has the following properties: When P is zero, the function $D_2$ is zero. Before the command $C_1$ is received, $D_2$ is zero. For a synchronous generator when the power flow is finite and $\alpha$ and $\phi$ are both positive, at the instant that the activating signal $C_1$ is received, the function $D_2$ is positive. For a synchronous generator when the power flow is finite and $\alpha$ and $\phi$ are both negative, the function $D_2$ is zero.

When $\alpha$ is less than a small positive number $\beta$, and $\phi$ is greater than a small value $D_2$ is zero. When $\alpha$ is more positive than $\beta$, $D_2$ has the sign of $\phi$ only for $|\phi|$ very large. When $\alpha$ is slightly greater than a small value $\beta$, functions. In the first case, it would be represented symbolically as $$gD_2 = \phi - m_2\alpha + n_2\alpha^2 + q_2\alpha^3 \qquad (8)$$

where $m_2$, $n_2$ and $q_2$ are arbitrary coefficients whose polarities and values are picked so that the Equation 8 set forth above defines the curve shown in FIGURE 6 which has been obtained experimentally.

The values of $m_2$, $n_2$ and $q_2$ for optimum performance are dependent upon the synchronous machine design, i.e., direct axis and quadrature axis reactance, moment of inertia, field time constant, damper winding constants and the steady state power level. They may be made automatically adjustable as a function of the latter. g is plus one for a generator and minus one for a motor.

TABLE II FOR FUNCTION $D_2$ IN SECOND DECISION MAKER

| Command $C_1$ | Command $C_3$ | Command $F_4$ | $\alpha$ | $\phi$ | Shaft and Electrical Power P | $D_2$ | Command $C_2$ | Field Voltage $V_f$ |
|---|---|---|---|---|---|---|---|---|
|  |  |  |  |  | 0 | 0 | No |  |
| Never been yes |  |  |  |  |  | 0 | No |  |
| Momentarily yes for $C_1$ | no or yes | no yes | $<\beta$ | $<\epsilon$ | Generator | 0 | No | Max. positive |
|  |  |  | $>\beta$ |  | Generator | $\geq 0$ | No |  |
|  |  |  |  |  |  | $\leq 0$ | Yes | Max. negative |
|  |  |  | $<\beta$ | $<\epsilon$ | Generator | 0 | No | Normal |
|  |  |  | $>\beta$ | $<\epsilon$ | Motor | 0 | No | Max. positive |
|  |  |  | $<\beta$ |  | Motor | $\geq 0$ | No |  |
|  |  |  |  |  |  | $\leq 0$ | Yes | Max. Negative |
|  |  |  | $>\beta$ | $>\epsilon$ | Motor | 0 | No | Normal |
|  | yes | no |  |  |  | 0 | No |  |

$D_2$ is approximately $\phi - m_2\alpha + n_2\alpha^2$. The locus of $D_2$ equal to zero is shown graphically in the $\phi$ versus $\alpha$ phase plane in FIGURE 6. When $D_2$ is negative, the command signal $C_2$ is generated to make the field voltage maximum negative, and to turn off or disable the first decision maker 51. When $C_3$ existed once and $F_4$ did not, $D_2$ is zero and the second decision maker 52 is locked out or disabled. When $C_3$ is followed by $F_4$, the second decision maker 52 is reactivated.

A summary of the polarity of the function $D_2$ is shown in the accompanying table. When $D_2$ is positive, no action is initiated by the second decision maker 52. When $D_2$ passes from positive to negative, the second decision maker 52 exits a command $C_2$ to cause the maximum neg- The third decision maker 53 generates internally a third nonlinear function $D_3$. In general, $D_3$ has the following properties: If $C_4$ is finite, $D_3$ is zero. If P is zero, $D_3$ is zero. If $\phi$ is positive for an electrical generator, $D_3$ is zero. If $\phi$ is negtive for an electrical motor, $D_3$ is zero. If $\alpha$ and $\phi$ have the same sign, $D_3$ is zero. $D_3$ is an active calculation when $\phi$ is negative and $\alpha > \beta$, for a synchronous generator. If $\alpha$ is positive and $\phi$ is negative, then $D_3$ starts off negative and for a certain relationship between $\alpha$ and $\phi$ it changes to positive. When it does the third decision maker 53 generates a signal $C_3$ which is used to disable the second decision maker. In addition, when $D_3$ is positive a comamnd $C_3$ is sent to the field voltage control to make the field voltage its maximum positive value. These relationships are summarized in Table III.

TABLE III FOR FUNCTION $D_3$ IN THIRD DECISION MAKER

| Command $C_2$ | Command $C_4$ | $\alpha$ | $\phi$ | Shaft Power | Electrical Power P | $D_3$ | Command $C_3$ | Field Voltage $V_f$ |
|---|---|---|---|---|---|---|---|---|
| Never been yes | | | | | | 0 | No | |
| Momentarily yes | No | | $\geq \epsilon$ | Gen. | | 0 | | |
| | | $\leq \beta$ | $<\epsilon$ | Gen. | | 0 | No | Normal |
| | | $>\beta$ | $<\epsilon$ | Gen. | | $\leq 0$ | No | |
| | | | | | | $>0$ | Yes | Max. positive |
| | | | $\leq \epsilon$ | Motor | | 0 | | |
| | | $\geq \beta$ | $\geq \epsilon$ | Motor | | 0 | No | Normal |
| | | $<\beta$ | $>\epsilon$ | Motor | | $\leq 0$ | No | |
| | | | | | | $>0$ | Yes | Max. positive |
| | yes | | | | | 0 | No | |

$D_3$ is a nonlinear function of $\phi$ and $\alpha$. This nonlinear function can be defined in terms of a curve such as in FIGURE 6, or by a piecewise linear approximation using a set of biased diodes, or by a power law nonlinearity. An approximation for $D_3$ is given by $$gD_3 = -\alpha - U_3\phi - V_3\phi^2 + W_3\phi^3 + X_3 \quad (9)$$

where $U_3$, $V_3$ and $W_3$ are arbitrary coefficients whose polarities and values are picked so that Equation 9 set forth above defines the curve shown in FIGURE 6 which has been obtained experimentally. $g$ is $+1$ for a generator and $-1$ for a motor. The values of the coefficients $U_3$, $V_3$ and $W_3$ are functions of the steady state power level of the synchronous machine. These coefficient values may be automatically adjusted by potentiometers whose shaft positions are controlled by the steady state power flow.

The fourth decision maker 54 receives input information from the torque angle sensor, from the frequency sensor, and from $C_3$. It is energized immediately after $D_3$ passes from negative to positive. The fourth decision maker calculates internally a decision function $D_4$, and externally it controls the following actions: It can issue a command $C_4$ to the field voltage control to return the field voltage from maximum positive to the normal value. It can issue a command $C_4$ through a disabling feedback connection which disables the third decision maker. It can issue a command $F_4$ which feeds back to the second decision maker such that in the presence of a signal on $F_4$ the diabling effect of $C_3$ is removed. The fourth decision maker 54 contains internally two preselected small numbers which are made slightly different than zero in order to obtain positive action from this decision maker. These two small numbers are $\beta$ and $\epsilon$ which are slightly positive in the case of a synchronous generator and slightly negative in the case of a synchronous motor. $\beta$ has units of angle $\alpha$ and $\epsilon$ has units of frequency deviation $\phi$. $\beta$ and $\epsilon$ are the maximum magnitudes respectively, which are acceptable for linear control. If $|\phi|<\epsilon$ and $|\alpha|<\beta$, no additional action on the part of the first three decision makers in FIGURE 3 is required. $\beta$ and $\epsilon$ are values of annular deviation and frequency deviation, respectively, above which it is desired to repeat the nonlinear control incorporated in the first three decision makers of FIGURE 5.

If $\alpha$ is more than $\beta$ and $\phi$ is less than $\epsilon$ for a synchronous generator, the function $D_4$ is zero and there are no commands issued by the fourth decision maker.

If $\alpha$ is equal to or less than $\beta$ and $\phi$ is equal to or less than $\epsilon$, for a synchronous generator, then the sequence of control actions has brought the machine to an acceptably small distance from the steady state condition and the nonlinear function $D_4$ is positive. The command $C_4$ restores normal excitation and disables the third decision maker. The command $F_4$ does not exist.

If $\phi$ goes more positive than $\epsilon$ before $\alpha$ has diminished to $\beta$ or less, then the sequence of control actions did not abstract enough energy from the rotor. The fourth decision maker 54 cancels command $C_3$ and reenergizes the second decision maker 52 with command $F_4$. Command $C_1$ holds the excitation at maximum positive after $C_3$ has disappeared. The second decision maker can again evaluate the state of the synchronous machine and as a function of this state calculate the decision function $D_2$ and generate command $C_2$ to the field voltage control. This permits negative excitation to be applied on the backward swing of the second cycle of rotor oscillations.

If the fourth decision maker 54 has issued the command

TABLE IV FOR FUNCTION $D_4$ IN FOURTH DECISION MAKER

| Command $C_3$ | $\alpha$ | $\phi$ | Shaft Power | Electrical Power P | $D_4$ | Command $C_4$ | Command $F_4$ | Field Voltage $V_f$ |
|---|---|---|---|---|---|---|---|---|
| Never been yes | | | | | 0 | no | no | |
| Momentarily yes | $>\beta$ | $<\epsilon$ | Gen. | Gen. | 0 | no | no | |
| | $>\beta$ | $>\epsilon$ | Gen. | Gen. | | no | yes | Continue max. pos. |
| | $<\beta$ | $<\epsilon$ | Gen. | Normal gen. | + | yes | no | Normal |
| | $\leq\beta$ | $>\epsilon$ | Gen. | | 0 | no | yes* | Max. Pos. |
| | $\leq\beta$ | $>\epsilon$ | Motor | Motor | 0 | no | no | |
| | $\leq\beta$ | $\leq\epsilon$ | Motor | Motor | | no | yes | Continue max. pos. |
| | $>\beta$ | $>\epsilon$ | Motor | Normal Motor | + | yes | no | Normal |
| | $>\beta$ | $<\epsilon$ | Motor | | 0 | no | yes* | Max. pos. |

*Or special second quadrant calculator.

$C_4$ and the excitation has returned to normal, but the machine trajectory did not stop at the origin of FIGURE 6, but instead passed through the third quadrant and came out in the second quadrant above $\phi=\epsilon$ and to the left of $\alpha=$zero, then the generator should have maximum positive excitation reestablished. The fourth decision maker 54 should turn off $C_4$. The first decision maker should reissue command $C_1$. The fourth decision maker should issue command $F_4$ to reenergize the second decision maker or energize a special second quadrant calculator.

As pointed out previously, FIGURE 6 is a phase presentation of a typical transient on a synchronous generator incorporating the control mechanisms of FIGURE 5. The state of the generator is represented by the continuous curve marke S. The abscissa $\alpha$ is measured torque-angle deviation from the steady state, and the ordinate $\phi$ is the measured frequency deviation from the steady state. Prior to the fault, the state of the system was represented by $\alpha=0$; $\phi=0$. Immediately following the opening of the circuit breaker, the state of the system moved into the first quadrant and after the breaker reclosed, the state of the system moved downward and to the right towards the fourth quadrant and after entering the fourth quadrant moved downward toward the left. In the first quadrant of operation, the decision function $D_1$ calculates a positive number. For the first interval after the breaker has reclosed, the field voltage is maximum positive.

The locus of $D_2=0$ is shown as a curved line in the first and fourth quadrants. The position of this line is a function of a nonlinear calculation. This line is called the switching curve for the second decision maker. Above this line the generator state causes the second decision maker to calculate a positive value for the function $D_2$. Below this line the generator state causes the second decision maker to calculate a negative value for the function $D_2$. When the trajectory S of the system state crosses the switching curve marked locus of $D_2=0$, the second decision maker delivers a command to the field voltage control to change it from maximum positive voltage to maximum negative voltage. After this command, the system state trajectory moves vertically downward and then slightly to the left through the fourth quadrant where the third decision maker 53 is effective. The locus of $D_3=0$ is shown as a switching curve in the fourth quadrant. The function $D_3$ is calculated by the third decision maker. When the system state lies to the right of the switching curve in the fourth quadrant, the function $D_3$ is negative. When the system state lies to the left of the switching curve in the fourth quadrant, the function $D_3$ is positive. When the machine state trajectory crosses the switching curve $D_3=0$, the third decision maker 53 issues a command to change the field voltage from maximum negative to maximum positive.

During this second interval when the filed voltage is maximum positive, the system state trajectory rises towards the origin. When it reaches the origin, the system state as defined by $\phi$ and $\alpha$ is equal to the steady state. At this instant, the field voltage and flux should also be normal so that the machine state considering all energy storage elements is equal to the steady state. To return the excitation voltage to normal, the fourth decision maker utilizes the two straight lines shown in FIGURE 4 as $\alpha=\beta$ and $\phi=\epsilon$. When the machine state trajectory crosses the $\alpha=\beta$ line in the fourth quadrant, the fourth decision maker 54 issues the command to the field voltage control to change the field voltage from maximum positive to normal excitation.

If following a first operating and closing of the circuit breaker, there were to be a second opening and reclosing of a circuit breaker due to a second fault during the time that the various decision makers in FIGURE 5 were operating, or if the synchronous machine shown in FIGURE 5 were to be located close to other synchronous machines that might be oscillating transiently, then it is possible that the machine state trajectory as shown in FIGURE 6 would not terminate at the origin following the crossing of the switching curve due to $D_4$ in the fourth quadrant, but might pass into the second quadrant or again into the first quadrant. If this happens, and if $\phi$ exceeds $\epsilon$, then the first decision maker 51 takes over again and the fourth decision maker 54 reenergizes the second decision maker 52. The second decision maker 52 calculates again the function $D_2$, which is positive in the first quadrant above the switching curve. The field voltage control 44 remains positive maximum, and the machine state trajectory will rotate in a clockwise direction. The second decision maker 52 calculates whether the system state lies above or below the locus of $D_2=0$, and when the trajectory crosses the switching curve $D_2=0$, then the second decision maker issues a command for the field voltage to go to maximum negative. The sequence of nonlinear decision is repeated as previously described.

The switching curves which have been shown in FIGURE 6 are for a single steady stage value of average power flow. The curves describe the state condition for the optimum switching instant for different trajectories. The different trajectories arise from different amounts of breaker-upon time prior to automatic reclosing. If the breakers 42 are open for a very short time, the trajectory has an elliptical shape near the origin of FIGURE 4 and lying in the first and fourth quadrants. If the breaker is open for a longer time, the trajectory describes a larger figure. There is a maximum amount of breaker-open time above which the conventional machine without this excitation control stability enhancement becomes unstable as shown in FIGURE 11A. At the limit of stability, the trajectory in the first quadrant, which is a curve like $s'$, becomes tangent to the $\alpha$ axis. Above the limit of stability the trajectory in the first quadrant comes down near to but does not touch the $\alpha$ axis and then $\phi$ increases for increasing $\alpha$. $\phi$ never goes negative for the unstable trajectory. FIGURE 11B shows stabilizing by reversing the excitation.

The shape of the trajectory in FIGURE 6 is influenced by the shape of the torque angle curve in FIGURE 2 with reference to the power level $P_s$. It can be seen that for very small values of $\alpha$, i.e., only a few degrees, the torque angle curve in FIGURE 2 appears to the straight line. For these small deflections then, the trajectory curves and the switching curves in FIGURE 6 are independent of the steady state power level $P_s$. But for large values of $\alpha$, the switching curves in FIGURE 6 are different, depending upon the initial power level $P_s$ of the steady state power flow. In general, the switching curves are rotated clockwise as the power level $P_s$ increases. In Equation 8 for the nonlinear function $D_2$, the coefficient $n_2$ increases as the steady state power level increases. The power flow P is one of the inputs to the second decision maker in FIGURE 3, and this information is used to generate $n_2$ as a constant plus a value which is a function of the steady state power level.

In Equation 9 for the nonlinear function $D_3$, for the shape of the switching curve shown in FIGURE 6, $U_3$ is a positive number and $V_3$ is also a positive number. The switching curve in FIGURE 4 will be moved in a clockwise direction if $V_3$ is increased in a positive direction. To generate the family of switching curves for a given machine, $V_3$ is taken as a constant plus a number which is a function of the steady state power flow. In FIGURE 5, the third decision maker 53 receives information from the power flow sensor for this purpose.

FIGURES 7A–7E show a typical sequence of events for this optimum control. In FIGURE 7A, the abscissa is time, and the ordinate is field voltage. In FIGURE 7B, the ordinate is field current; in FIGURE 7C it is internal flux; in FIGURE 7D it is frequency deviation; and in FIGURE 7E it is torque angle deviation.

FIGURE 8 is a circuit diagram of a frequency sensor which is suitable for use in the apparatus shown in FIGURE 3. The shaft 37 of the synchronous machine 36 is connected to a 420 c.p.s. 3-phase permanent magnet generator 61. The output of the generator 61 is connected to the input windings of a 3-phase transformer 62. The output windings of the transformer 62 are connected to pairs of diodes 63 which form a 3-phase full-wave rectifier 64. A load resistor R is connected to the outputs of the diodes 63 and the center taps of the output windings of the transformer 62. An unfiltered rectified voltage appears across the load resistor R and has a ripple component of 2520 c.p.s. which may be used as a signal proportional to the mechanical frequency or speed of the synchronous machine shaft 37. This signal appearing across the load resistor R is coupled to a frequency meter 66 through a capacitor C. The frequency meter 66 can be of a suitable type such as a Hewlett-Packard 500B which has a direct current output of 1 milliampere or 1 volt. Such a frequency meter as shown in FIGURE 6 can contain an amplifier 67, a clipper 68, a pulse counter 69 and a DC current generator 71. The signal supplied to the frequency meter 66 is first amplified, then clipped and the cycles counted to produce an output DC voltage proportional to the frequency of the ripple $f_r$. The output of the frequency meter 66 is called the voltage $V_f$ and is a measure of the instantaneous frequency.

The output of the frequency meter 66 is connected to a memory integrator 72 through a summing network 73. The memory integrator 72 consists of an infinity gain amplifier 74 with a resistor 76 connected to its input. An integrating capacitor 77 is connected across the input and the output of the amplifier 74 and is connected to an output terminal 78. The output terminal 78 is connected to serially connected resistors 79 and 81 which are connected to the output of frequency meter 66. The input resistor 76 is connected to a summing junction 82 between the resistors 79 and 81. The summing junction 82 is also connected to a buffer amplifier 83 and to an input resistor 84. The input resistor is connected to an infinity gain amplifier 86. Resistor 87 is connected between the input and the output of the infinity gain amplifier. The output of the amplifier 86 is connected to an output terminal 88. The output from the memory integrator 72 is indicated as $-100V_f$ average and is a measure of the average frequency over the past several minutes. In the steady state, the sum of $V_f$ and $-V_f$ average should be zero. This sum is obtained at the summing junction 82 and becomes the error input to the memory integrator to cause it to slowly change its output to equal the average $V_f$. The sum of negative average frequency and positive instantaneous frequency is proportional to $\phi$. The summing junction 82 has a voltage proportional to $\phi$ and the buffer amplifier 83 amplifies this by a factor of 102 to produce a usable signal equal to $100\Delta V_f$ which is proportional to $\phi$.

FIGURE 9 is a circuit diagram of a torque angle sensor. The synchronous machine shaft 37 is connected to a small permanent magnet synchronous generator 91 with a number of poles equal to or less than the number of poles in the main synchronous machine. The permanent magnet generator armature provides a voltage whose phase is a measure of the mechanical phase of the synchronous machine shaft 37. In order to have a short time memory of the phase of the synchronous machine shaft 37 prior to a transient, a second generator 92, called a memory permanent magnet synchronous generator, is operated like a motor and provided with a shaft 93 connected to a large flywheel 94. The size of the flywheel 94 is so chosen that the memory machine will not change its phase significantly during a period of a few seconds. The armatures of the two permanent magnet generators 91 and 92 are connected together through high impedances 96 which must carry only the power represented by the losses of the second generator. A motor starter 95 is provided for starting the memory permanent magnet generator 92 to bring it up to speed. Thereafter, sufficient power is supplied through the impedances 95.

In normal operation, the two generators 91 and 92 are running synchronously and with a fixed phase relationship between them. During fault conditions, the sensing permanent magnet generator 91 connected to the main synchronous machine shaft will change its phase as a function of the shaft oscillations, whereas the memory generator 92 connected to the flywheel 94 will not change its phase. The phase relationship between the two generators is obtained by connecting the primary of a transformer 97 to the leads from phase $d-e$ of the flywheel generator 92 and connecting the primaries of two separate transformers 98 and 99 to the leads $a-b$ from a phase shifting network 100 which is connected to the synchronous machine phase measuring permanent magnet generator 91. Rectifiers in the form of diodes 101, 102, 103 and 104 are connected to the secondaries of the transformer 97. The secondaries of the transformers 98 and 99 are interconnected and are connected to center taps of the secondaries of transformer 97. Load resistors 106 are connected across the outputs of the diodes 101–104. Filtering capacitors 107 are also connected across the outputs of the diodes 101–104.

The rectifier 101 receives the sum of the reference and variable phase voltages and rectifies it to produce a positive signal. The rectifier 102 takes the difference between the reference and the variable phase and rectifies it to produce a positive signal. The difference between these two positive signals is the measure of the deviation from a 90° phase relation between the two voltages. In the next pair of rectifiers, the rectifier 103 takes the difference of the two voltages and rectifies it to produce a positive signal with conduction on the alternate half cycles from the previously derived signal. Rectifier 104 takes the sum of the two voltages and rectifies it. A second set is used because it operates on the other half cycle and, therefore, the parallel combination of the outputs of the two sets produces a full-wave rectified signal whose direct current has a polarity and magnitude proportional to the phase deviation from a 90° relationship between the signal $a-b$ and the signal $d-e$. Thus, it can be seen that the transformers 97, 98, 99, the diodes 101–104 and the resistors 106 in combination serve as a phase detector 108. In order to generate the signal $\alpha$ which is proportional to the torque angle deviation from the steady state, the steady state output voltage of the phase detector 108 must be brought to zero. This is done by use of either the adjustable phase shifter 100 or a memory integrator 111. As can be seen from FIGURE 9, the output of the phase detector 108 is connected to the memory integrator through a summing network 112 consisting of serially connected resistors 113 and 114. The summing junction 116 between resistors 113 and 114 is connected to an input resistor 117. The input resistor 117 is connected to an operational amplifier 118 of infinity gain and capacitor 119 is connected between the input and the output of the operational amplifier 118. The output of the amplifier is connected to output terminal 121 and is also connected to one side of the resistor 114. The summing junction 116 is also connected to an input resistor 123 which is connected to an operational amplifier 124. The output of the operational amplifier is connected to an output terminal 126. A resistor 127 is connected between the input and output of the operational amplifier 124.

In operation, the memory integrator produces a D-C bias $\delta$ (average). This D-C bias is proportional to the steady state torque angle and in steady state conditions, the adjustment is made automatically by means of the operational amplifier 118 connected as an integrator so that the output of the integrator provides the D-C bias. The integration time constant is chosen to be very long so that the D-C bias is proportional to the average power for the past several minutes. The memory integrator 111 produces the positive of the average torque angle and the output of the full-wave rectifiers produces the negative of the instantaneous torque angle. In steady state, these two values are made equal by taking the sum at the center tap between the resistors 113 and 114 and setting this sum equal to zero by using it as the input to the memory integrator. This sum is also equal to one-half of $\alpha$ and by using the buffer amplifier 122 and a gain of 200, a signal equal to $100\alpha$ is generated.

In FIGURE 10 I have shown an alternative apparatus and method for obtaining a signal proportional to the torque angle deviation $\alpha$. A mechanical differential 131 is directly connected to the shaft 37 of the synchronous machine. The mechanical differential 131 has three rotatable shafts. One is connected to the main synchronous machine shaft 37 and rotates at the same speed and phase as the main synchronous machine shaft. The second rotatable shaft 132 is connected to a flywheel 133 large enough so that ts stroboscopic angle does not change significantly in a time of several seconds when the flywheel is providing all of the frictional losses in the mechanical differential. A relay actuated mechanical brake 136 is connected to shaft 134 and is provided with a brake control 137. The brake is of a type which can be in engagement as long as the circuit breaker is closed and there is no transient and which can be released or disengaged by the circuit breaker actuating relays to operate the brake control 137 so that the shaft 134 is following a transient until steady state has been reestablished. On the same shaft 134, there is provided a rotary potentiometer 138 having a stationary resistance 139 and a sliding contact 141 in which the sliding contact has an angle proportional to the torque angle deviation from the steady state torque angle. A voltage source is impressed across the two fixed terminals of the resistance 139 to provide a voltage variable with the position of the sliding contact 141. The sliding contact is so positioned that its voltage to ground is equal to zero during steady state operating conditions when the brake 136 is engaged or on. When the brake is off, therefore, the output voltage is proportional to $\alpha$.

FIGURE 11B shows the action of the optimum excitation control when the breaker has reclosed after the conventional limit of stability has been passed. If the excitation were not changed, the machine state variables would increase in a manner similar to the unstable trajectory shown in FIGURE 11A.

The optimum control reverses the excitation flux as the torque angle $\delta$ goes from less than 180° to more than 180°. To anticipate the lag of field current and flux after the voltage, the field voltage must be reversed before the torque angle $\delta$ reaches 180°. Curve $r_1$ in FIGURE 11B is the optimum switching relationship between $\phi$ and $\delta$ to reverse the field voltage. This will be near $$\delta = 180° - k\phi \quad (10)$$

$$\alpha = 180° - \alpha_s - k\phi \quad (11)$$

When the rotor angle exceeds $\alpha=180°$, the generator delivers more power than it receives, the rotor starts to slow down, and the shaft frequency diminishes. Eventually the rotor will reach a maximum angle of swing, and $\phi$ will then go negative as the rotor starts back towards $180°+\alpha_s$ for its new steady state angle. To prevent the rotor from coming back too fast, there should be a region of motor action due to maximum positive excitation. The optimum relationship for switching from maximum negative to maximum positive excitation is shown as curve $r_2$ in FIGURE 11B.

As $a$ approaches $180+$ and $\delta$ approaches $180+\alpha_s$, the relationship shown by curve $r_3$ in FIGURE 11B is satisfied, and the excitation is again made maximum negative just prior to reaching the new steady state condition so that the field current will be brought rapidly to its steady-state value from a positive or small negative value to a large negative value. When the machine state crosses relationship $r_4$ in FIGURE 11B, normal negative excitation is applied, and the field current becomes normal concurrently with the torque angle and frequency reaching their steady-state values.

In FIGURES 12–15 are shown circuit diagrams of the first, second, third and fourth decision makers 51–54 used in the system and apparatus shown in FIGURE 5. Although in FIGURES 12–15, relays have been used to facilitate showing the mode of operation of the decision makers, it normaly would be preferable to use faster switching devices such as one which can be obtained with the use of solid state electronics.

Figure 12:
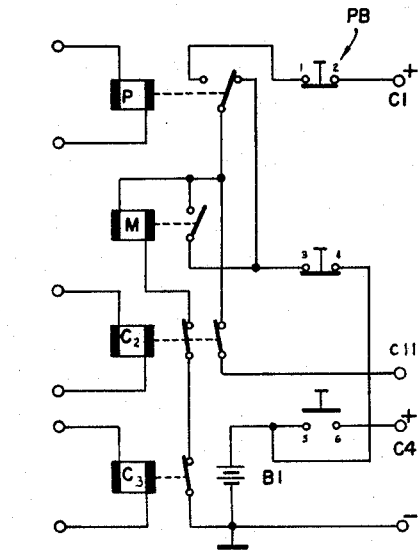

In the first decision maker shown in FIGURE 12, a reset pushbutton PB is provided to set the relays in the decision maker for normal operating conditions. Thus when the pushbutton PB is pressed command $C_4$ is generated and transmitted to the field voltage control 44 shown in FIGURE 5 to cause normal excitation to be supplied to the synchronous machine 36 and to cause normal power flow over the power circuit 39. Normal power flow holds relay P energized to open its normally closed contact. A command $C_1$ cannot be delivered.

During normal excitation of the electrical machine 36, the command $C_4$ for normal excitation is continuously delivered because the relays $\phi$ and $\alpha$ in the fourth decision maker are not energized. The normally closed contacts of these two relays deliver power from the battery B6 shown in FIGURE 15 to the $C_4$ terminal to provide the command $C_4$. Relays $\phi$ and $\alpha$ are not energized because during normal excitation, both $\phi$ and $\alpha$ are near zero and less than $\epsilon$ and $\beta$ respectively.

Now let it be assumed that power flow on the power circuit 39 goes to zero due to a fault in the power system causing the breakers 42 to open. As soon as the power goes to zero the P relay in the first decision maker shown in FIGURE 12 is deenergized or drops out. This causes terminal $C_{11}$ to have positive voltage impressed from battery B1 and the memory relay M to be energized from the battery B1 through the normally closed contacts of relays $C_2$ and $C_3$. As soon as relay M is energized, a holding circuit is established for relay M through its normally open contacts which are now closed and through the contacts 3 and 4 of the pushbutton PB. When power flow is reestablished on the power circuit 39 after the fault on the power system has been cleared and the circuit breakers 42 have been reclosed, relay P is again energized to close its normally open contact and to supply the command $C_1$ which is a positive voltage from the battery B1 through the contacts 3 and 4 of the pushbutton PB, the closed normally open contacts on the relay M and the closed normally open contacts of the relay P and contacts 1 and 2 of the pushbutton to the $C_1$ terminal shown in FIGURE 10. Command $C_1$ is a command calling for maximum positive excitation which is delivered to the field voltage control 44 through the adder 55. This command for maximum positive excitation is delivered until the command $C_2$ is delivered to energize the relay $C_2$ to open the energizing circuit for the memory relay M and to thereby interrupt the command $C_1$.

Figure 13:
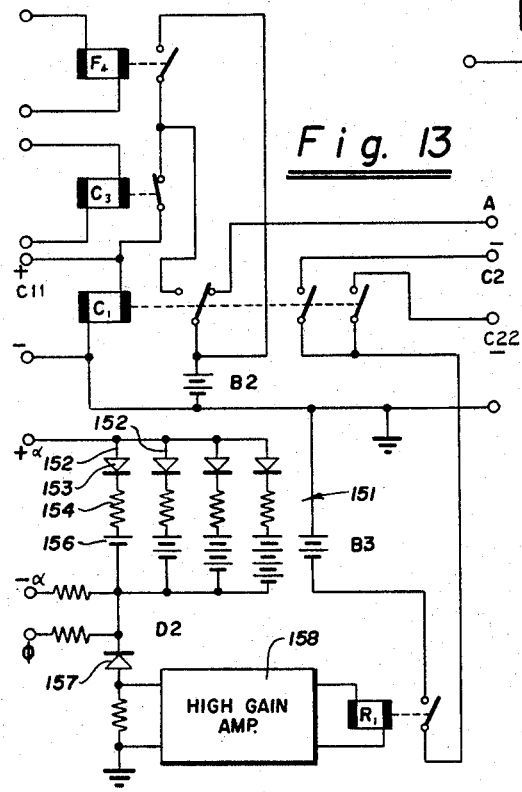

Now examining the decision maker shown in FIGURE 13, when the P relay is deenergized, it energizes the relay $C_1$, through a common circuit joining the terminal $C_{11}$ in FIGURE 12 to terminal $C_{11}$ in FIGURE 13 and a holding circuit is established for relay $C_1$ through one of its own sets of contacts and contacts on relay $C_3$. A command $C_2$ is delivered through the other sets of contacts of relay $C_1$ to terminals $C_2$ and $C_{22}$ when the network 151 is delivering a negative voltage to the diode 157. This negative voltage is amplified by the high gain amplifier 158 which energizes relay $R_1$ to close its contacts and to complete the circuit from a battery B3 through the contacts of the relay $C_1$ to deliver the $C_2$ command on the $C_{22}$ and $C_2$ terminals shown in FIGURE 13. The network 151 is a nonlinear function generator which consists of a plurality of parallel branches 152 with each consisting of a diode 153, a resistor 154 and a battery 156 connected in series. The branches represent the terms $\alpha$, $\alpha^2$ and $\alpha^3$ in Equation 8. As can be seen from FIGURE 13, the network 151 has its input terminals identified as $+\alpha$ and $-\alpha$ and is connected to the torque angle sensor 48. An additional input terminal identified as $\phi$ is provided as an input to the diode 157 and represents the $\phi$ term in Equation 8. When the sum of outputs from the network 151 and $\phi$ terminal is positive, nothing is supplied to the high gain amplifier 158 because of the diode D2 and hence no command $C_2$ is supplied to the field voltage control. It is only when the output supplied to the diode 157 is negative that the command $C_2$ is supplied by the second decision maker in FIGURE 13.

As soon as the $C_2$ command is generated, the relay $C_2$ in FIGURE 12 is energized to open its normally closed contacts to terminate the command $C_1$ by interrupting the holding circuit for the relay M and disconnecting the holding voltage on relay $C_1$ and terminal $C_{11}$ from terminal $C_1$. Even though the power flow on power circuit 39 may go through zero during the time that the relay $C_2$ is energized, the command $C_1$ cannot be supplied a second time because the memory relay M is not energized.

Figure 14:
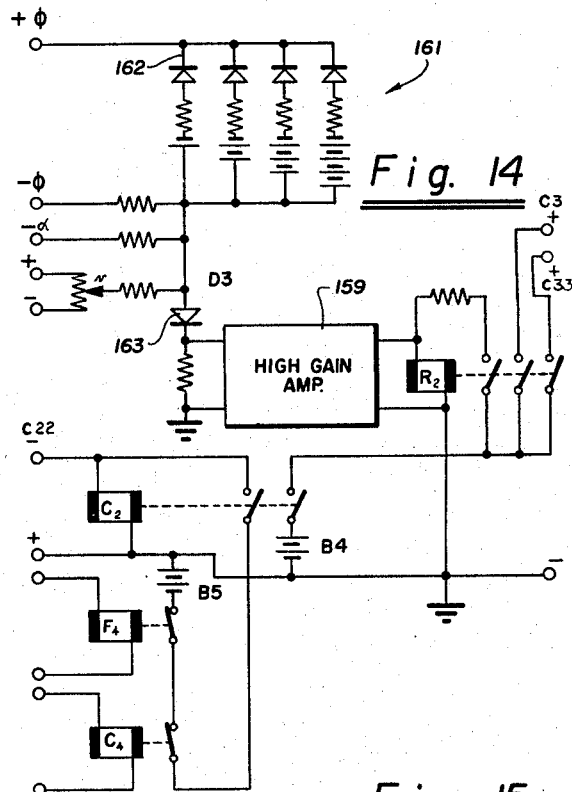

In the third decision maker shown in FIGURE 14, the command $C_2$ energizes the relay $C_2$ through terminal $C_{22}$. One of the sets of contacts on the relay $C_2$ establishes a holding circuit for the relay $C_2$. Energization of the relay $C_2$ by the command $C_2$ will also cause the closing of its other set of contacts to supply a voltage from the battery B4 which will be supplied to the $C_3$ and $C_{33}$ terminals to provide the command $C_3$ when the relay $R_2$ has been energized by the high gain amplifier 159. A nonlinear network 161 similar to the nonlinear network 151 provided in FIGURE 13 is also provided in the third decision maker and has its terminals identified as $+\phi$ and $-\phi$ and is connected to the frequency sensor 47. Also connected to the high gain amplifier 159 is the $-\alpha$ input from the torque angle sensor 48.

The network 161 is a nonlinear function generator which is provided with a plurality of parallel branches 162 similar to the branches shown in the network 151 and which represent the terms $\phi$, $\phi^2$ and $\phi^3$ shown in Equation 9. As also shown in Equation 9, the function D3 is a nonlinear function of $\alpha$ and a constant voltage v.

When the combined outputs from the nonlinear network 161 and the inputs of the other terminals connected to the high gain amplifier 159 are positive, a signal is supplied to the high gain amplifier 159 and the relay $R_2$ is energized so that the command $C_3$ is supplied. Operation of relay $R_2$ also establishes a holding circuit for the relay $R_2$ from battery B4 through one of its sets of contacts and through contacts of relay $C_2$ in FIGURE 14.

The command $C_3$ which corresponds to a maximum positive voltage command is supplied to the adder 55 and to the field voltage control 44 to again cause maximum positive voltage excitation to be supplied to the synchronous machine 36. The command $C_3$ causes energization of the $C_3$ relay in the first decision maker in FIGURE 12. During the time that the command $C_3$ exists an incorrect return to the command $C_1$ will not occur because the memory relay M has been deenergized.

The command $C_3$ disables the second decision maker by energizing the relay $C_3$ in the second decision maker to open the holding circuit for the relay $C_1$. Deenergization of the relay $C_1$ terminates the command $C_2$ and places a voltage on the A terminal.

Figure 15:
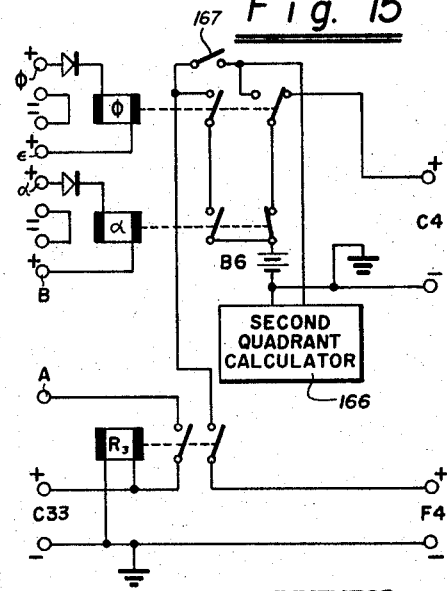

The command $C_3$ energizes relay $R_3$ in FIGURE 15 and a holding circuit for this relay is established through one set of its normally open contacts and terminal A which receives voltage from battery B2 in FIGURE 13.

The fourth decision maker shown in FIGURE 15 receives input information from the torque angle sensor 48, from the frequency sensor 47 and from the command D3. It is energized immediately after the function D3 passes from negative to positive. The fourth decision maker calculates internally a decision function D4 and externally controls a number of actions.

With the machine trajectory in the fourth quadrant with $\alpha$ positive and $\phi$ negative, the $\alpha$ relay is energized and the $\phi$ relay is not energized. With this condition, there is no command on $C_4$. If the machine trajectory goes into the origin that is $\alpha$ is equal to or less than $\beta$ and $\phi$ is eqaul to or less than $\epsilon$, for a generator, both relays $\phi$ and $\alpha$ will be deenergized and the command $C_4$ will be produced from the battery B6.

If $\phi$ is greater than $\epsilon$ and $\alpha$ is greater than $\beta$, both relays $\phi$ and $\alpha$ are energized to prevent the command $C_4$. Energization of relays $\phi$ and $\alpha$ cause positive voltage from battery B6 to pass in series through normally open contacts on relays $\phi$, $\alpha$, and $R_3$ to terminal F4 to cause a command $F_4$ to be delivered. The command $F_4$ energizes the relay $F_4$ in the third decision maker in FIGURE 14 which opens the holding circuit for the relay $C_2$ and thereby removes the command $C_3$. Relay $C_3$ in FIGURE 13 is deenergized.

The command F4 also energizes the relay $F_4$ in the second decision maker in FIGURE 13. When the relay $F_4$ is energized, the disabling effect of command $C_3$ is eliminated. Voltage from battery B2 energizes relay $C_1$ whose normally open contacts close to provide a holding circuit. The action of relay $C_1$ removes voltage from terminal A. This voltage was the holding voltage on relay $R_3$ in FIGURE 15, and this relay is deenergized, removing the command F4. Relay $R_3$ may be a time-delay drop-out type. The holding voltage on relay $C_1$ also appears on terminal $C_{11}$ in FIGURE 13, and in FIGURE 12 this voltage passes in series through normally closed contacts on relay $C_2$ and normally open contacts on relay P to produce the command $C_1$ on terminal $C_1$. The sequence of control actions by the several decision makers is then repeated.

When $\alpha$ is equal to or less than $\beta$ and $\phi$ is equal to or less than $\epsilon$, for a synchronous generator, then the frequency sequence of control actions has brought the electrical machine 36 to an acceptably small distance from the steady state condition and the nonlinear function D4 is positive. Both relays $\phi$ and $\alpha$ are deenergized to permit the command $C_4$ to be supplied by the battery B6 to cause normal excitation to be supplied to the electrical machine and to disable the third decision maker by energization of relay $C_4$ which terminates the command $C_3$. The command F4 then does not exist.

The function generators 151 and 161 contain adjustable resistors and adjustable voltages which can be adjusted in accordance with the steady state power flow to adjust the switching curves in FIGURE 6 to the desired relationships.

If $\phi$ goes more positive than $\epsilon$ while $\alpha$ is more positive than $\beta$, then the sequence of control actions did not abstract enough energy from the rotor. Both relays $\phi$ and $\alpha$ are energized to cause command F4 to be generated. This is independent of whether $C_3$ or $C_4$ has been the last previous command. If $C_4$ was the last command, then relays $C_2$, $C_3$, and $R_2$ are all deenergized. $R_3$ is energized. Command F4 reestablishes command $C_1$ and reenergizes the second decision maker by energizing relays $F_4$ and $C_1$. The second decision maker can then again evaluate the status of the synchronous machine 36 as a function of this state and then recalculate the decision function $D_2$ and generate command $C_2$ to the field voltage control. This permits negative excitation to be applied on the backward swing of the second cycle of rotor oscillations. Thereafter, the same sequence of operations is followed as hereinbefore described until the machine trajectory goes into or very near the origin so that relays $\alpha$ and $\phi$ are deenergized.

A second quadrant calculator 166 is provided in the fourth decision maker which is actuated when the $\phi$ relay is energized and the α relay is not. The calculator 166 can be used to facilitate controlling a machine trajectory which passes through or near the origin and then continues into the second quadrant. Or alternatively, if 166 is not used, the switch 167 may be closed and a suitable second quadrant nonlinear function is provided in function generator 151.

From the foregoing it can be seen that I have developed a new system, apparatus and method for improving the stability of synchonous machines in such a manner that transient oscillations of the shaft due to momentary power line disconnects can be reduced to zero in minimum time and steady state reestablished. In certain of the embodiments hereinbefore described decision makers have been provided which utilize torque angle information and frequency information. It should be understood that the decision makers are not limited to such information, for example, a running tally of the stored energy in the rotor can be obtained from wattage integrations from the power flow information. This can be used instead of frequency as an acceptable state variable for a switching curve or for generating a nonlinear decision function. The quantity of power flow is related in an ambiguous manner to the torque angle but this ambiguity can be removed if in addition the phase angle of the current is also measured. Therefore, a state variable can be obtained from a combination of the power flow and the phase of the current, which state variable may be used to derive switching curves instead of using the torque angle information.

When controlling the excitation of a machine in accordance with my invention, the purpose of the last maximum positive excitation is to increase the field current rapidly from its deficient or negative value to its steady state value so that the field current will reach its steady state value at the same instant as the shaft frequency.

The reason that second order phase planes can be used instead of third order state space or phase space switching surfaces for this obviously third order system is because the transients which are permitted are not all possible transients coming from all possible initial conditions, but instead are the limited class of transients which start from the steady state operating condition. If the synchronous machine were continuously in a state of transient oscillation from continuous random disturbances to the impedance connecting the synchronous machine to the power system or continuous fluctuations in the mechanical power on the synchronous machine shaft due perhaps to fluctuating load conditions, then the excitation control might have to use switching curves defined by instantaneous surfaces in a three dimensional state space. The projection of this surface in three dimensional state space on one of the planes which is the phase plane of frequency versus phase angle would produce a family of curves. Because of the assumption that the power flow has been relatively constant at a steady state value during the interval prior to the transient disturbance and that it will return to the same or a different steady state value after the transient disturbance, this three dimensional surface can be replaced by one of the switching lines in the two dimensional plane defined by the particular steady state power.

I claim:

1. In an electrical system, an electrical circuit having impedance properties, an electrical machine having one stationary part, one movable part, at least one excitation winding and at least one power winding, said power winding being a part of said electrical circuit, means for sensing a first state variable of the machine proportional to the speed of said movable part, means for sensing a second state variable of the machine other than the alternating voltage magnitude, the time derivative of the alternating voltage magnitude and the alternating current magnitude, means producing a first signal responsive to said first state variable, means producing a second signal responsive to said second state variable, a single means responsive both to said first signal and to said second signal for controlling the power flow in said electrical circuit by affecting the impedance properties of said electrical circuit.

2. A system as in claim 1 wherein the means for controlling the power flow is a circuit breaker.

3. A system as in claim 1 wherein the means for controlling the power flow includes means for exciting the excitation winding and means for controlling said means for exciting the excitation winding.

4. A system as in claim 1 wherein said means for sensing a first state variable senses the shaft frequency of the machine and wherein the means for sensing the second state variable senses the power flow in the machine.

5. A system as in claim 1 wherein said means for sensing said second state variable senses the phase angle of the movable part and wherein the means for sensing the first state variable senses the rate of change of phase angle of the movable part.

6. A system as in claim 1 including means for generating a third signal responsive to the kinetic energy of the movable part, and wherein said means for controlling the power flow is also responsive to said third signal.

7. A system as in claim 1 wherein said means for sensing the second state variable senses the angular position of the movable part.

8. A system as in claim 1 wherein said means for sensing the second state variable senses the phase of the current in the power winding with respect to the voltage in the power winding and wherein said means for sensing the first state variable senses the rotational frequency of the moving part.

9. A system as in claim 1 wherein said means for sensing the second state variable senses the phase of the current in the power winding with respect to the voltage in the power winding and including means for generating a third signal responsive to the movable part and wherein said means for controlling the power flow is also responsive to said third signal.

10. In an electrical system, an electrical machine having one stationary part, one movable part, at least one excitation winding and at least one power winding, means for supplying excitation to the excitation winding, means for supplying a reference frequency and a predetermined reference, means for sensing a first state variable of the machine proportional to the speed of the said movable part, means for sensing a second state variable of the machine, both of said first and second state variables being other than the current magnitude in said power winding, means for producing a signal responsive to said first and second state variables, and also responsive to said reference frequency and said predetermined reference, and a single means responsive to said signal for controlling the power flow from the machine.

11. A system as in claim 10 wherein said means for controlling the power flow from the machine consists of circuit breakers.

12. A system as in claim 10 wherein said means for controlling the power flow from the machine in the machine includes means for controlling the excitation on the excitation winding of the machine.

13. A system as in claim 10 wherein said means for sensing the second state variable senses the phase of the movable part with respect to the predetermined reference.

14. A system as in claim 10 wherein said means for sensing the first state variable senses the difference in frequency between the movable part and the reference frequency and wherein said means for sensing the second state variable senses the phase of the movable part with respect to the predetermined reference.

15. A system as in claim 10 wherein said means for sensing the first state variable senses the difference in frequency between the movable part and the reference frequency and wherein the means for sensing the second state variable senses the difference in phase between the movable part and the predetermined reference.

16. A system as in claim 10 wherein said means for sensing the first state variable senses the frequency of a function of the voltage and the current in the power winding and wherein the means for sensing the second state variable senses the phase of the said function with respect to the predetermined reference.

17. In an electrical system, an electrical circuit having impedance properties, an electrical machine having one stationary part and one movable part, at least one excitation winding, and at least one power winding with an alternating voltage, said power winding being a part of said electrical circuit, means for supplying excitation to the excitation winding, means for sensing at least two state variables of the machine, other than the alternating voltage magnitude, one of said state variables being the rate of change of position of the said movable part, means for generating a plurality of signals each responsive to one of the said state variables, and control means responsive to the said signals for controlling the power flow in the power winding by affecting the impedance properties of the electrical circuit.

18. A system as in claim 17 wherein said means for controlling the power flow includes circuit breaker means for changing the power flow.

19. A system as in claim 17 wherein said control means for controlling the power flow includes means for controlling the excitation of the machine.

20. A system as in claim 17 wherein said means for sensing state variables of the machine senses the angular position of the movable part and the rate of change of position of the movable part.

21. A system as in claim 17 wherein said means for sensing state variables of the machine senses the angular position of the movable part, the rate of change of position of the movable part, and the electrical power flow in the power winding.

22. A system as in claim 17 wherein said means for sensing state variables of the machine senses the electrical power flow in the power winding.

23. A system as in claim 17 wherein the means for sensing state variables of the machine senses the angular position of the movable part, and the current in the excitation winding.

24. A system as in claim 17 together with an external device connected to the movable part and wherein the means for sensing the state variables of the machine are responsive to the angular position of the movable part, the current in the excitation winding, and the power flow between said movable part and said external device.

25. In an electrical system, an electrical machine having one stationary part, one movable part, at least one excitation winding and at least one power winding, a mechanical device, means connecting the mechanical device to the movable part, means for supplying excitation to the excitation winding of the electrical machine, means measuring the power flow in the power winding of the electrical machine, means responsive to the power flow between the movable part and the mechanical device, control means responsive to a function of the integrated difference between the said power flow in the power winding and said power flow between the movable part and the mechanical device, and means controlling the excitation in the excitation winding in response to said control means.

26. In an electrical system, a power system having impedance properties, an electrical machine having one stationary part, one movable part, at least one excitation winding and at least one power winding, said power winding being a part of said power system, a mechanical device, means connecting the mechanical device to said movable part, means for supplying excitation to the excitation winding, function means for producing a function of the energy stored within the electrical machine responsive to the time integration of the difference between the electrical power flow in said power winding and the mechanical power flow between the movable part and the mechanical device, and a single means for controlling the power flow in said power winding in response to said function means by affecting the impedance properties of said power system.

27. In an electrical system, an electrical machine having one stationary part, one movable part, at least one excitation winding and at least one power winding, means for supplying excitation to the excitation winding, a power system, means connecting the power system to the power winding, means for measuring a power deviation signal having a polarity equal to the polarity of the power flow in said power winding less a preexisting steady state power flow, means for measuring a frequency deviation signal having a polarity equal to the polarity of the frequency of the movable part less the preexisting steady state frequency, means for measuring a first time interval time during which said power deviation signal has a polarity opposite the polarity of the frequency deviation signal, means for measuring a second time interval in which said power deviation has a polarity the same as the polarity of the frequency deviation signal, means for measuring a third time interval during which both deviation signals have polarities opposite to their respective polarities during the said first time interval, means for measuring a fourth time interval during which both deviation signals have polarities opposite their respective polarities during the second time interval, power control means for changing the power flow in the power winding as a function of the measured second and third intervals and restoration means for restoring said steady state power flow as a function of the measured first, second, third and fourth time intervals.

28. A system as in claim 27 together with a circuit in series with said power winding and said power system, and wherein said power control means and said restoration means controls said circuit in series with said power winding.

29. A system as in claim 27 wherein said power control means reduces the magnitude of positive excitation to said excitation winding at a predetermined time relationship with respect to the end of said third time interval, and wherein said restoration means restores normal excitation to the excitation winding at a predetermined time with respect to the end of the fourth time interval.

30. A system as in claim 17 together with a circuit breaker connected to said power winding such that when the circuit breaker is closed the power flow from said power winding is larger than when the circuit breaker is open, and wherein said power control means and said restoration means control said circuit breaker.

31. A system as in claim 27 wherein said power control means and said restoration means control the voltage applied to the excitation winding.

32. In an electrical system, an electrical machine having one stationary part and one movable part, at least one excitation winding, at least one power winding, means for supplying excitation to the excitation winding, a power system, means connecting the power winding to the power system, first signal means responsive to the stored mechanical energy in the machine, second signal means responsive to the position of the movable part, and a single means controlling the power flow in the power winding responsive to the said first signal means and second signal means.

33. A system as in claim 32 wherein said means for controlling the power flow includes an element with a bivalued output having two states.

34. A system as in claim 32 wherein said means for controlling the power flow in the power winding includes means for controlling the means for supplying the excitation to the excitation winding.

35. In an electrical system, an electrical machine having one stationary part, one movable part, at least one excitation winding, at least one power winding, means for supplying excitation to the excitation winding, a power system, means connecting the machine to the power system, a mechanical device, means connecting the mechanical device to the machine, first and second timers, means for measuring the shaft frequency of the machine and supplying the information to the timers, means for measuring power flow in the machine, means for supplying preset decision times to the timers, means for supplying the measured power flow information in the machine to the timers and means controlled by the timers for controlling the power flow in the machine.

36. A system as in claim 35 wherein the means for controlling the power flow includes means connected to the timers for controlling the means supplying excitation to the machine.

37. A system as in claim 35 wherein the means for controlling the power flow includes means connected to the timers for opening and closing the circuit breaker means.

38. In an electrical system, an electrical machine having one stationary part, one movable part, at least one excitation winding, and at least one power winding, means for supplying excitation to the excitation winding, a power system, means connecting the power winding of the machine into the power system, said power system having impedance properties, means for sensing a first state variable of the machine, responsive to the alternating frequency of said movable part, means for sensing a plurality of different other state variables of the machine other than the alternating current magnitude, decision making means connected to the outputs of said means for sensing state variables, a single means controlling the power flow of the machine by affecting the impedance properties of the power system and means connecting the decision making means controlling the power flow.

39. A system as in claim 38 wherein the means for controlling the power flow includes means for controlling the means for supplying excitation.

40. A system as in claim 38 wherein the means for controlling the power flow includes a circuit breaker forming a part of means connecting the power winding to the power system.

41. In an electrical system, an electrical machine having one stationary part, one movable part, at least one excitation winding, at least one power winding, means for exciting the excitation winding, a power system, means connecting the power winding to the power system, means for increasing the power flow in the power winding to a maximum, means for reversing the power flow to a negative maximum as the movable part approaches its maximum negative frequency deviation, means for applying maximum positive excitation voltage to overcome field time delay when the movable part is approaching the steady state torque angle position, and means for applying normal excitation when the movable part is at its correct steady state angle, at the correct steady state frequency and with the field current at its correct steady state value.

42. In a method for improving the stability of an electrical system having impedance properties and including an electrical machine with a rotating part, sensing a first state variable other than the current magnitude in the machine, sensing a second state variable related to the speed of said rotating part, generating a signal responsive to both said first state variable and second state variable, and controlling the power flow in the electrical machine in accordance with said signal by affecting the impedance properties of said electrical system.

43. In a method for improving the stability of an electrical machine having a stationary part, one movable part, at least one excitation winding and at least one power winding, said power winding being a part of an electrical circuit having impedance properties, sensing at least two state variables of the electrical machine other than the magnitude of the alternating current in said power winding, the second of said variables related to the stored energy in said movable part, combining the first and second state variables and controlling the impedance properties of said electrical circuit in accordance with the first and second state variables.

44. A method as in claim 42 wherein the first state variable is obtained by sensing the phase angle of the movable part and wherein the second state variable is obtained by sensing the rate of change of the phase angle of the movable part.

45. A method as in claim 42 wherein the second state variable is determined by measuring kinetic energy and wherein the first state variable is determined by sensing said power flow.

46. A method as in claim 42 wherein the first state variable is determined by sensing the internal torque angle of the movable part and wherein the second state variable is determined by sensing the rate of change of the internal torque angle of the movable part.

47. A method as in claim 42 wherein the first state variable is determined by sensing the position of the movable part and wherein the second state variable is determined by sensing the velocity of the movable part.

48. In a method for improving the stability of an electrical machine having one stationary part, one movable part, at least one excitation winding and at least one power winding, increasing the power flow in the power winding to a maximum, diminishing the power flow in the power winding to a limiting value, reestablishing maximum positive power flow in the power winding and thereafter causing normal current flow in the power winding.

49. In a method for improving the stability of an electrical machine having one stationary part, one movable part, at least one excitation winding and at least one power winding, increasing the current flow in the power winding to a maximum, diminishing the current flow in the power winding to a minimum, and reestablishing a constant magnitude of current flow in the power winding.

50. In a method for improving the stability of an electrical machine having one stationary part, one movable part, at least one excitation winding and at least one power winding, the sequence of increasing the power flow in the power winding to a maximum, diminishing the power flow in the power winding to a minimum, and establishing a constant power flow.

51. In an electrical system, an electrical machine having one stationary part, one movable part, at least one excitation winding and at least one power winding, a power system, means connecting said power system and said power winding, means for sensing the state of said connecting means, means for increasing the power flow in the said power winding to a maximum in response to said state, means for subsequently diminishing the power flow in the said power winding to a minimum, and means for finally establishing a constant power flow.

52. In an electrical system, an electrical machine having one stationary part, one movable part, at least one excitation winding and at least one power winding, a power system, circuit means connecting said power system and said power winding, means for sensing the power flow in said circuit means, means for increasing the said power flow to a maximum, means for reversing said power flow, and means for establishing a constant power flow.

53. In a dynamic system of the character described, a source of power having an energy storage element, a load for absorbing power, coupling means capable of transferring energy from the source of power to the load, and means for controlling the energy transferring characteristic of the coupling means, said last named means including means for detecting the initiation of a transient oscillation in the system, means changing the energy transferring characteristic of the coupling means upon detection of the initiation of the transient oscillation, and means for restoring the energy transferring characteristic of the coupling means to its normal value after approximately one-half period of the transient oscillation to minimize subsequent transients.

54. A system as in claim 53 wherein the means for controlling the energy transferring characteristic of the coupling means consists of means for controlling the power flow characteristic of the coupling means and wherein said means for detecting the initiation of a transient oscillation consists of means for detecting a change in the power flow from the power source to the load.

55. A system as in claim 53 wherein said means for controlling the energy transferring characteristic of the coupling means consists of means for controlling the relationship between the power flow and the energy in the energy storage element.

56. In a system of the character described, a synchronous electrical machine, said synchronous machine having a shaft, an excitation winding and a power winding, a load, means connecting the power winding to the load, means supplying excitation power to the excitation winding, sensing means for sensing the state of said means connecting the power winding to the load and for determining the initiation of a transient oscillation in the system, and means connected to the sensing means to increase the excitation to the excitation winding at the initiation of a transient oscillation and then restoring the excitation to the excitation winding to normal when the transient oscillation closely approaches a new steady state value.

57. A system as in claim 56 wherein said sensing means consists of means for measuring the shaft angle of the machine and a transient oscillation in the shaft angle of the machine and wherein the means for increasing the excitation winding of the machine and restoring the excitation to normal restores the excitation to normal at approximately one-half the period of the transient oscillation following initiation of the transient oscillation.

58. A system as in claim 56 wherein said sensing means consists of means for detecting the phase of the voltage in the power winding of the machine and the initiation of a transient oscillation in the phase of the voltage of the machine.

59. A system as in claim 56 wherein said sensing means consists of means for detecting the energy stored in the machine and the initiation of a transient oscillation in the stored energy.

60. In a system of the character described, a synchronous machine having a shaft, an excitation winding and a power winding, a load, means connecting the power winding to the load, means supplying excitation power to the excitation winding, voltage regulating means connected to the power winding and being responsive to the magnitude of the voltage in the power winding, transient quenching means connected to the power winding and being responsive to the phase of the voltage in the power winding, and control means connecting the voltage regulating means to the means for supplying excitation power to the excitation winding when the phase of the voltage is constant and for connecting the transient quencher to the means for supplying excitation power to the excitation winding when the phase of the voltage is changing.

61. In a system of the character described, a synchronous machine having a shaft, an excitation winding and a power winding, a load, means connecting the power winding to the load, means supplying excitation power to the excitation winding, means connected to the synhcronous machine for detecting the onset of a transient oscillation which will change the stroboscopic angle of the shaft, means for increasing the internal open-circuit voltage on the power winding in response to the detection of the onset of a transient oscillation, means for measuring the instantaneous frequency of the power winding of the machine, and means connected to said means for measuring the instantaneous frequency for restoring the internal open-circuit voltage to normal after a predetermined time.

62. In a system of the character described, a reactive component having power flow therethrough and having an equivalent reactance, control means for altering the equivalent reactance of the reactive component, first sensing means responsive to the initiation of a transient oscillation in the system, second sensing means responsive to the deviation of the system state from a desired final steady state, and relay means responsive to the first sensing means to activate the control means to diminish the equivalent reactance and also responsive to the second means to deactivate the control means to restore the equivalent reactance to the desired steady state value.

63. In a system of the character described, a reactive component having power flow therethrough and having an equivalent reactance, control means for altering the equivalent reactance of the reactive component, first sensing means responsive to the initiation of a transient oscillation in the system, second sensing means responsive to the deviation of the system state from a desired final steady state, and means responsive to the first sensing means to activate the control means to change the equivalent reactance and also responsive to the second sensing means to deactivate the control means to restore the equivalent reactance to a desired steady state value, said control means including a switch with two terminals, such that when the switch is open, the equivalent reactance is more capacitive.

64. In a power system, a reactive component having power flow therethrough, control means for producing a voltage phase shift in series with said reactive component, first sensing means responsive to the initiation of a transient oscillation in the system, second sensing means responsive to the deviation of the system state from a desired final steady state, and relay means responsive to the first sensing means to activate the control means and also responsive to the second sensing means to deactivate the control means to restore the voltage phase shift to the desired steady state value.

65. In an alternating current power transmission system characterized by a nonlinear relationship between the power flow and the voltage phase angle difference between two parts of the system, means for detecting the onset of a transient, means for altering said nonlinear relationship during the transient, and means for restoring the said nonlinear relationship to a normal steady state value when the said phase angle difference closely approaches a steady state value.

66. In a dynamic system with an energy storage element associated with a source of power, a load absorbing power, a coupling carrying power from the source to the load, and a control on the power flow characteristic of the coupling, means for detecting the initiation of a transient change in the power flow from source to load, means for changing said characteristic responsive to the detection of the initiation of a transient change, and means for restoring the said characteristic to a steady state value after approximately one-half period of the transient oscillation to minimize subsequent transients.

67. In a power transmission system of the type containing energy storages and a control to alter the power transmission characteristic, means to sense the state of the system with respect to two of the stored energies, means to produce a first operation of said control responsive to a first function of said state, and means to produce a second operation of said control responsive to a second function of said state at a time when the transient state approaches the desired steady state.

68. In a method for controlling the synchronous machine of the type having a shaft and an excitation winding and in which a voltage regulator is provided for controlling the excitation supplied to the excitation winding, comprising the steps of determining when a transient oscillation occurs in the synchronous machine, and overriding the voltage regulator as soon as a transient is detected to increase the excitation to the excitation winding for a period of time approximating one-half of the period of the transient oscillation to minimize the effect of the transient oscillation after said period of time.

69. A method as in claim 68 in which the step of detecting the initiation of a transient oscillation is performed by measuring the stroboscopic angle of the machine shaft.

70. In a method for controlling a synchronous machine of a type having a shaft, an excitation winding and a power winding comprising the steps of detecting the onset of a transient oscillation in the system which would alter the shaft angle of the shaft of the machine, increasing the excitation on the excitation winding upon the onset of the transient oscillation, and changing the excitation to the excitation winding so that the excitation current in the excitation winding approaches normal as the time derivative of the frequency of the power winding approaches zero.

71. In an alternating current power transmission system having an energy storage component and having a normal state, means for sensing a vector exclusive of the alternating current magnitude and the alternating voltage magnitude of the system responsive to changes in the state of the system from the normal, means for computing from said vector a signal responsive to changes in the stored energy in said component, adjusting means for changing the power flow into and out of said component, means for computing the phase difference between one element of said vector at one location in said system and a second phase used as a temporary reference, and control means responsive to said vector to control said adjusting means to cause said phase difference to equal a preselected value when said energy equals a predetermined value.

72. A system as in claim 71 wherein said system includes a series impedance and wherein said adjusting means adjusts said series impedance.

73. A system as in claim 71 wherein said system includes a switch connected into said system and having open and closed states and wherein said adjusting means controls the states of said switch.

74. A system as in claim 71 wherein said system includes a synchronous rotating machine having an excitation winding and means for supplying excitation to the excitation winding and wherein said adjusting means adjusts said excitation means by adjusting the quantity of excitation supplied to the excitation winding.

75. A system as in claim 71 wherein said system has a predetermined value of power flow at said one location and wherein said adjusting means causes said power flow at said one location to exceed said predetermined value for the interval of time when said energy exceeds said predetermined value and to equal the predetermined value of power flow when said energy equals the predetermined value.

76. A system as in claim 71 wherein said system includes a power absorbing load and wherein said adjusting means adjusts said power flow into said power absorbing load.

77. In a system of the character described, a source of power, a load absorbing power, an energy storage element, an alternating current transmission line circuit interconnecting said source of power, said load, and energy storage element and being capable of transmitting power into and out of said element, said system having a state variable having a normal predetermined value, means for sensing said state variable responsive to an alternating phase angle in said system, computer means generating an initial command in response to a transient change in said variable from its normal predetermined value and generating a final command when said variable approaches said predetermined value, and control means responsive to said initial and final commands for controlling a characteristics of said circuit.

78. A system as in claim 77 wherein said control means is responsive to the initial command to increase the power transmitting capability of said circuit during a portion of said transient and is responsive to said final command to decrease the power transmitting capability of said circuit.

79. A system as in claim 77 wherein said system includes a switch connected into the transmission circuit and wherein said characteristic is the open and closed state of said switch.

80. A system is in claim 77 wherein said characteristic is the relationship between said variable and the power transmitted.

81. A system as in claim 77 wherein said system includes a synchronous machine having an excitation winding and control means for supplying excitation to the excitation winding and wherein said characteristic is the quantity of excitation supplied to said excitation winding.

82. In an electrical power system, an electrical circuit having impedance properties, an alternating current machine having one stationary part, one rotating part, at least one excitation winding, and at least one power winding, said power winding having a characteristic impedance, said power winding being a part of said electrical circuit and conducting alternating current, said power winding having an alternating voltage across the power winding terminals, a reference frequency, a predetermined constant, means for exciting the excitation winding, a single means for controlling the power flow in said electrical circuit by affecting the impedance properties of said electrical circuit, means for sensing a first state variable of the machine said first state variable being proportional to the kinetic energy of said rotating part, means for producing a first signal responsive to said first state variable less said reference frequency, means for sensing a second state variable of the machine other than linear transformations of only the alternating voltage magnitude, means for producing a second signal responsive to said second state variable less said predetermined constant, and wherein said single means is responsive to both said first signal and said second signal.

83. A system as in claim 82 wherein said means for exciting the said excitation winding is responsive to said single means.

84. A system as in claim 83 wherein said second state variable is proportional to the phase angle of said rotating part.

85. A system as in claim 84 including a decision function dependent upon the relation between said first signal and said second signal, and wherein said single means is responsive to said decision function.

86. A system as in claim 84 including a plurality of decision functions dependent upon said first and second signals, wherein said single means is responsive to said plurality of decision functions to sequentially firstly increase, secondly decrease, and thirdly increase the excitation of said excitation winding.

87. A system as in claim 84 including a predetermined minimum number, wherein said single means is responsive to the first and second signals to produce an increase in the excitation of said excitation winding when either of said signals exceeds said predetermined minimum number and to produce subsequent changes in the said excitation to cause both of said signals to diminish monotonically following a maximum magnitude of said first signal.

88. A system as in claim 84 including a decision function dependent upon the first and second signals and wherein said single means is responsive to said decision function such that the excitation of said excitation winding is increased to a predetermined maximum value during the interval when said first and second signals have opposite polarities and said second signal is diminishing in absolute magnitude.

89. A system as in claim 84 wherein said first state variable is the frequency of a composite function of said alternating voltage and said alternating current and wherein said second state variable is the phase of a composite function of said alternating voltage and said alternating current.

90. A system as in claim 83 wherein said second state variable is responsive to the phase angle of the said alternating voltage.

91. A system as in claim 83 wherein said second state variable is responsive to the motion of the said rotating part.

92. A system as in claim 83 wherein said second state variable is responsive to the said power flow.

93. A system as in claim 83 wherein said second state variable is responsive to the current in the said power winding.

94. A system as in claim 82 wherein said single means for controlling the power flow is a circuit breaker.

95. A system as in claim 94 including means for sensing a third state variable responsive to the phase angle of the said rotating part, and wherein said second state variable is responsive to the said power flow, and wherein said means for controlling the power flow is also responsive to said sensed third state variable.

96. A system as in claim 94 including means for sensing a third state variable responsive to an elapsed time and wherein said second state variable is responsive to the said power flow and wherein said means for controlling the power flow is also responsive to said third state variable.

97. A system as in claim 82 including means for sensing a third state variable responsive to the said power flow, and wherein said second state variable is responsive to the phase angle of the said alternating voltage, and wherein said single means for controlling the said power flow is also responsive to said sensed third state variable.

98. A system as in claim 82 including means for sensing a third state variable responsive to the said power flow, and wherein said second state variable is responsive to the phase angle of the said rotating part, and wherein said single means for controlling the power flow is also responsive to said sensed third state variable, and wherein said single means for controlling the power flow is a circuit breaker.

99. A system as in claim 82 together with an electrical winding mounted in relation to said rotating part such that the frequency of the generated alternating voltage in said electrical winding is proportional to the speed of said rotating part, and wherein said first state variable is responsive to said frequency of the generated alternating voltage.

100. A system as in claim 82 including an electrical winding mounted in relation to said rotating part such that the phase of the generated alternating voltage in said electrical winding is proportional to the phase of said rotating part, and wherein said second state variable is responsive to said phase of the generated alternating voltage.

101. A system as in claim 83 wherein said first state variable is proportional to the frequency of the internal generated alternating voltage in said power winding and wherein said first state variable is responsive to a function of said alternating voltage across the power winding terminals and also responsive to the product of the said characteristic impedance times the said alternating current.

References Cited
UNITED STATES PATENTS

| | | | |
|---|---|---|---|
| 2,793,335 | 5/1957 | Woodruff | 318—18 |
| 3,051,883 | 8/1962 | Smith | 318—448 |

ORIS L. RADER, *Primary Examiner.*

G. RUBINSON, *Assistant Examiner.*

UNITED STATES PATENT OFFICE
CERTIFICATE OF CORRECTION

Patent No. 3,388,305      Dated June 11, 1968

Inventor(s) OTTO J. M. SMITH

It is certified that error appears in the above-identified patent and that said Letters Patent are hereby corrected as shown below:

Claim 12, Col. 26, lines 2 & 3     delete "in the machine"

Claim 30, Col. 28, line 1     change "17" to --27--

Claim 77, Col. 33, line 15     change "characteristics" to --characteristic--

Claim 82, Col. 34, line 1     change "electrcal" to --electrical--

SIGNED AND SEALED
DEC 15 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,388,305            Dated June 11, 1968

Inventor(s) Otto J.M. Smith

It is certified that error appears in the above-identified patent and that said Letters Patent are hereby corrected as shown below:

Claim 57, line 5, before "excitation" insert --excitation to the--

Signed and sealed this 3rd day of April 1973.

(SEAL)
Attest:

EDWARD M. FLETCHER, JR.           ROBERT GOTTSCHALK
Attesting Officer                  Commissioner of Patents